United States Patent
Davis et al.

(10) Patent No.: US 11,338,915 B2
(45) Date of Patent: *May 24, 2022

(54) ROTOR SYSTEMS AND METHODS

(71) Applicant: Bell Textron Inc., Fort Worth, TX (US)

(72) Inventors: Alison Ann Davis, Greenville, SC (US); Charles Speller, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/925,455

(22) Filed: Jul. 10, 2020

(65) Prior Publication Data

US 2020/0339254 A1   Oct. 29, 2020

Related U.S. Application Data

(63) Continuation of application No. 16/429,863, filed on Jun. 3, 2019, now Pat. No. 10,745,124, which is a continuation-in-part of application No. 15/788,039, filed on Oct. 19, 2017, now Pat. No. 10,343,787.

(51) Int. Cl.
| | |
|---|---|
| *B64C 27/82* | (2006.01) |
| *B64C 27/06* | (2006.01) |
| *B64C 11/02* | (2006.01) |
| *B64C 11/30* | (2006.01) |

(52) U.S. Cl.
CPC ............. *B64C 27/82* (2013.01); *B64C 11/02* (2013.01); *B64C 11/30* (2013.01); *B64C 27/06* (2013.01); *B64C 2027/8254* (2013.01); *B64C 2027/8272* (2013.01)

(58) Field of Classification Search
CPC ........ B64C 27/82; B64C 11/02; B64C 11/30; B64C 27/06; B64C 2027/8254; B64C 2027/8272
See application file for complete search history.

(56) References Cited

U.S. PATENT DOCUMENTS

| | | |
|---|---|---|
| 5,834,696 A | 11/1998 | Kurosawa et al. |
| 8,038,539 B2 | 10/2011 | Stamps et al. |
| 9,068,404 B2 | 6/2015 | Angelle et al. |
| 9,145,772 B2 | 9/2015 | Baxley |
| 9,174,728 B2 | 11/2015 | Altmikus et al. |
| 10,035,590 B2 | 7/2018 | Probst |
| 10,343,787 B2 | 7/2019 | Davis |

(Continued)

OTHER PUBLICATIONS

Notice of Allowance, dated Feb. 28, 2019, by the USPTO, re U.S. Appl. No. 15/788,039.

(Continued)

*Primary Examiner* — Igor Kershteyn
(74) *Attorney, Agent, or Firm* — Timmer Law Group, PLLC

(57) ABSTRACT

An aircraft rotor system including a hub having a hub axis about which the hub is configured to rotate; a plurality of rotor blades configured to extend from the hub and rotate about the hub axis, at least one of the rotor blades rotatable about a respective pitch change axis; wherein the hub is configured to be rotated about the hub axis only by the plurality of rotor blades. Another aspect includes a method of operating the rotor system.

20 Claims, 17 Drawing Sheets

(56) References Cited

U.S. PATENT DOCUMENTS

| | | |
|---|---|---|
| 10,407,166 B2 | 9/2019 | Lauder |
| 10,745,124 B2 | 8/2020 | Davis et al. |
| 10,797,547 B2 * | 10/2020 | Randall .................. H02K 21/24 |
| 2016/0221672 A1 | 8/2016 | Latham et al. |
| 2016/0363206 A1 | 12/2016 | Modrzejewski et al. |
| 2017/0144746 A1 | 5/2017 | Schank et al. |
| 2017/0259916 A1 | 9/2017 | Shundo et al. |
| 2018/0022448 A1 | 1/2018 | Orbon |
| 2018/0339769 A1 | 11/2018 | McCullough et al. |
| 2018/0362154 A1 | 12/2018 | Louis et al. |
| 2020/0148342 A1 * | 5/2020 | Randall .................. B64C 13/26 |

OTHER PUBLICATIONS

Notice of Allowance, dated Jun. 12, 2020, by the USPTO, re U.S. Appl. No. 16/429,863.

* cited by examiner

ROTOR SYSTEMS AND METHODS

CROSS-REFERENCE TO RELATED APPLICATIONS

This application is a continuation of U.S. patent application Ser. No. 16/429,863, filed Jun. 3, 2019, which claims priority to and is a continuation-in-part of U.S. patent application Ser. No. 15/788,039, filed Oct. 19, 2017, the disclosures of which are hereby incorporated by reference for all purposes as if fully set forth herein.

BACKGROUND

Technical Field

The present disclosure relates to rotor systems and methods relating thereto and, more particularly, to aircraft rotor systems and methods for rotating such systems.

Description of Related Art

Conventional rotor assemblies have rotor hubs that are coupled to and powered by conventional drive systems, including large gearboxes and large drive shafts coupled to the rotor hub, which requires large rotor hubs to accommodate the drive systems. A large rotor hub decreases the usable flow area of a rotor assembly and, therefore, decreases rotor assembly efficiency and increases weight. Furthermore, one drive system coupled to and powering a rotor assembly results in a single point of failure for the rotor assembly, which can increase the likelihood of rotor assembly failure and decrease safety.

There is a need for a rotor system and method that increases the usable flow area of a rotor assembly, increases efficiency of the rotor assembly, decreases weight of the rotor assembly, and decreases the likelihood of rotor assembly failure.

SUMMARY

In a first aspect, there is provided an aircraft rotor system including a hub having a hub axis about which the hub is configured to rotate; a plurality of rotor blades configured to extend from the hub and rotate about the hub axis, at least one of the rotor blades rotatable about a respective pitch change axis; wherein the hub is configured to be rotated about the hub axis only by the plurality of rotor blades.

In an embodiment, the system further includes a hub having a hub axis about which the hub is configured to rotate; a plurality of rotor blades configured to extend from the hub and rotate about the hub axis, at least one of the rotor blades rotatable about a respective pitch change axis; wherein the hub is configured to be rotated about the hub axis only by the plurality of rotor blades.

In another embodiment, the hub comprises a rotatable housing and a non-rotatable housing.

In still another embodiment, the at least one of the rotor blades rotatable about a respective pitch change axis comprises a rotor blade assembly rotatably coupled to the rotatable housing.

In an embodiment, the rotor blade assembly includes a rotor blade and a pitch horn associated therewith.

In yet another embodiment, the pitch control mechanism includes an actuator assembly disposed on the non-rotatable housing of the hub and a spider assembly translatable along at least a portion of the hub axis by the actuator assembly.

In an embodiment, the actuator assembly comprises at least one of the following: a linear actuator, a bell crank mechanism, and a geared system.

In an embodiment, the actuator assembly receives input from a pilot in the aircraft, a user remote from the aircraft, and/or a flight control computer.

In another embodiment, the spider assembly is rotated about the hub axis by the pitch horn.

In a second aspect, there is provided an aircraft rotor system comprising a hub having a hub axis about which the hub is configured to rotate; an externally driven rim configured to rotate about the hub axis, the externally driven rim configured to be rotated by a driving member; and a plurality of rotor blades operably coupled to the externally driven rim and the hub, at least one of the rotor blades rotatable about a respective pitch change axis; wherein the externally driven rim is configured to rotate the plurality of rotor blades and hub about the hub axis.

In an embodiment, the system further includes a pitch control mechanism operably associated with the hub and the at least one of the rotor blades rotatable about a pitch change axis; the pitch control mechanism configured to rotate the at least one of the rotor blades rotatable about the respective pitch change axis to control the pitch thereof.

In another embodiment, the at least one of the rotor blades rotatable about a respective pitch change axis comprises a rotor blade assembly including a rod disposed between the hub and the externally driven rim, the rod being associated with a rotor blade and configured to permit rotation of the rotor blade about the respective pitch change axis.

In an exemplary embodiment, the rod is configured to rotate the hub about the hub axis.

In yet another embodiment, the rod passes through a channel disposed in the rotor blade.

In still another embodiment, the driving member is disposed adjacent to the externally driven rim.

In another embodiment, the driving member is configured to provide mechanical energy from a power source.

In still another embodiment, the power source is mechanical, hydraulic, and/or electric.

In an embodiment, the driving member and the externally driven rim do not require engagement therebetween.

In an exemplary embodiment, the driving member comprises a plurality of driving members disposed adjacent to the externally driven rim.

In a third aspect, there is provided a method of operating an aircraft rotor system including providing a rotor assembly, comprising a hub having a hub axis about which the hub is configured to rotate; an externally driven rim configured to rotate about the hub axis, the externally driven rim configured to be rotated by a driving member; a plurality of rotor blades configured to extend from the hub and rotate about the hub axis, each of the rotor blades rotatably coupled to the hub and the externally driven rim such that rotation of the externally driven rim rotates the plurality of rotor blade assemblies and the hub about the hub axis, at least one of the rotor blades rotatable about a respective pitch change axis; a pitch control mechanism operably associated with the hub and the at least one of the rotor blades rotatable about the respective pitch change axis; providing a driving member disposed adjacent to the externally driven rim; rotating the driving member to impart rotation to the externally driven rim, the plurality of rotor blade assemblies, and the hub about the hub axis; and actuating the pitch control mechanism to rotate the at least one of the rotor blades rotatable about the respective pitch change axis to control the pitch thereof.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Figure 1:
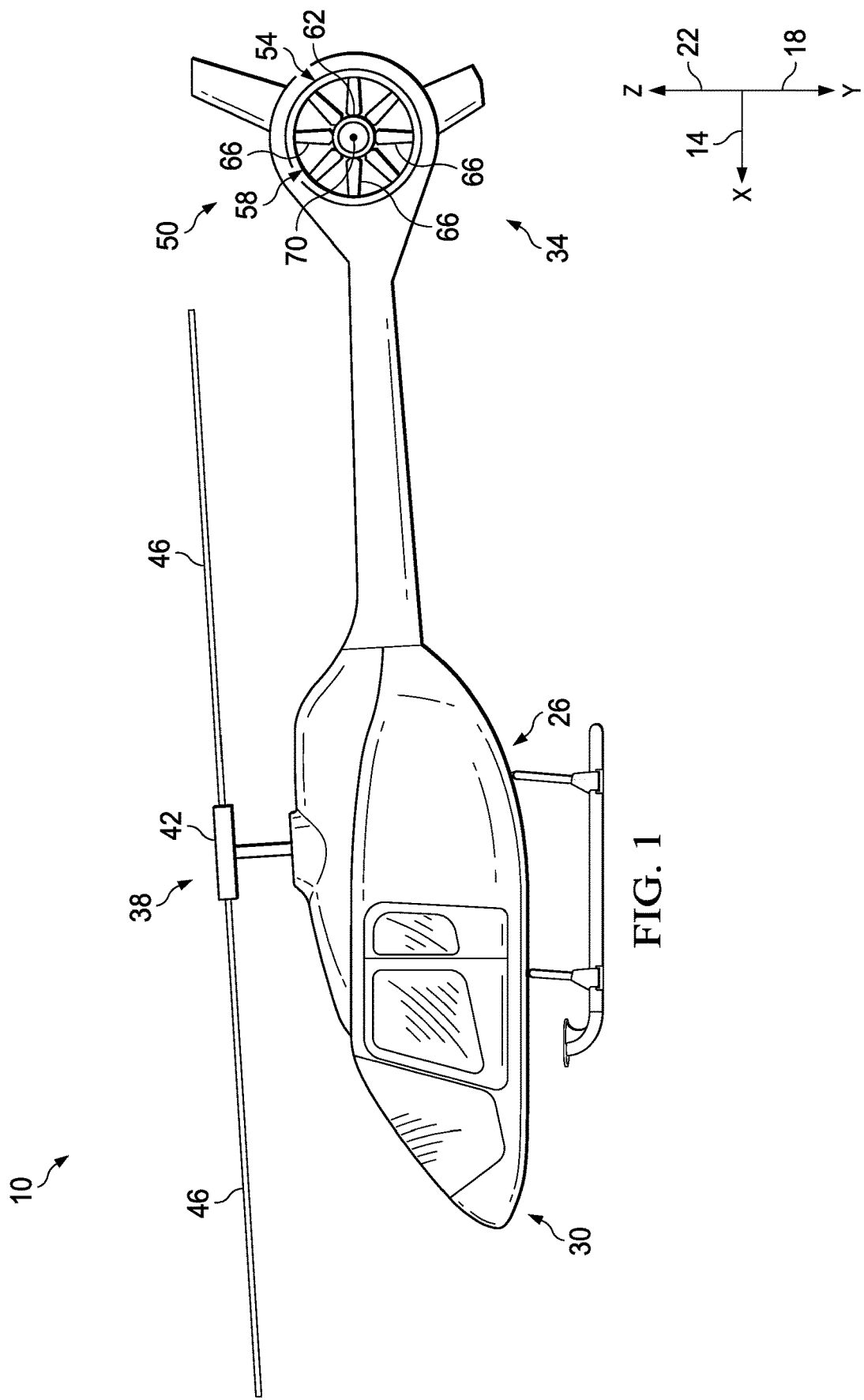
FIG. 1 is a side view of an aircraft, according to one example embodiment.

Illustrative embodiments of rotor systems and methods are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, assemblies, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices, members, assemblies, etc. described herein may be oriented in any desired direction.

This disclosure depicts and describes rotor systems, components and features thereof, and methods relating thereto. Any rotor system, component and feature thereof, or method relating thereto depicted in FIGS. 1-10 and/or described herein can be used with the aircrafts depicted in FIGS. 1 and 4. Additionally, the rotor systems, components and features thereof, and methods relating thereto depicted and/or described herein can be used with any aircraft having one or more rotor assemblies, including tiltrotor aircrafts, helicopters, tilt wing aircrafts, unmanned aerial vehicles (UAVs), hovercrafts, and other vertical lift or VTOL aircrafts, or can further be used with any device having one or more components having rotor assemblies, including devices with propellers, windmills, and turbines. Further, any features of one embodiment of the rotor systems or components thereof in this disclosure can be used with any other embodiment of the rotor systems or components thereof in this disclosure such that the other embodiment has the same or similar features, operates in the same or similar way, or achieves the same or similar functions. Some components of this disclosure are depicted by graphic shapes and symbols. Unless this disclosure specifies otherwise, such components should be understood to include the same or similar characteristics and features as those components that are named or described, though the graphic shapes and symbols may not depict each such characteristic or feature.

FIG. 1 depicts aircraft 10 and three mutually orthogonal directions X, Y, and Z forming a three-dimensional frame of reference XYZ. Longitudinal axis X 14 extends through the center of aircraft 10 in the fore and aft directions. Transverse axis Y 18 is perpendicular to longitudinal axis X 14. The X-Y plane is considered to be "horizontal." Vertical axis Z 22 is oriented perpendicularly with respect to the X-Y plane. The X-Z plane and Y-Z plane are considered to be "vertical."

Aircraft 10 includes fuselage 26 as a central main body. Fuselage 26 extends parallel to longitudinal axis 14 from a fuselage front end 30 having a cockpit to a fuselage rear end 34. Aircraft 10 further includes a main rotor assembly 38, including hub 42 and plurality of rotor blades 46. Aircraft 10 and components thereof, such as main rotor assembly 38, can, for example, be coupled to and controlled with a power system connected to a drive system, such as one continuous drive system or a segmented drive system separated by a gearbox, including electric propulsion systems, hydraulic drive systems, or conventional drive systems. Main rotor assembly 38 is controllable and positionable to, for example, enable control of direction, thrust, and lift of aircraft 10. For example, main rotor assembly 38 can, if activated, provide a lifting thrust to aircraft 10 during takeoff and landing to enable aircraft 10 to move substantially in the Z direction. Furthermore, main rotor assembly 38 can, if activated, provide a forward thrust to aircraft 10 to enable aircraft 10 to move substantially in the X direction.

Figure 2:
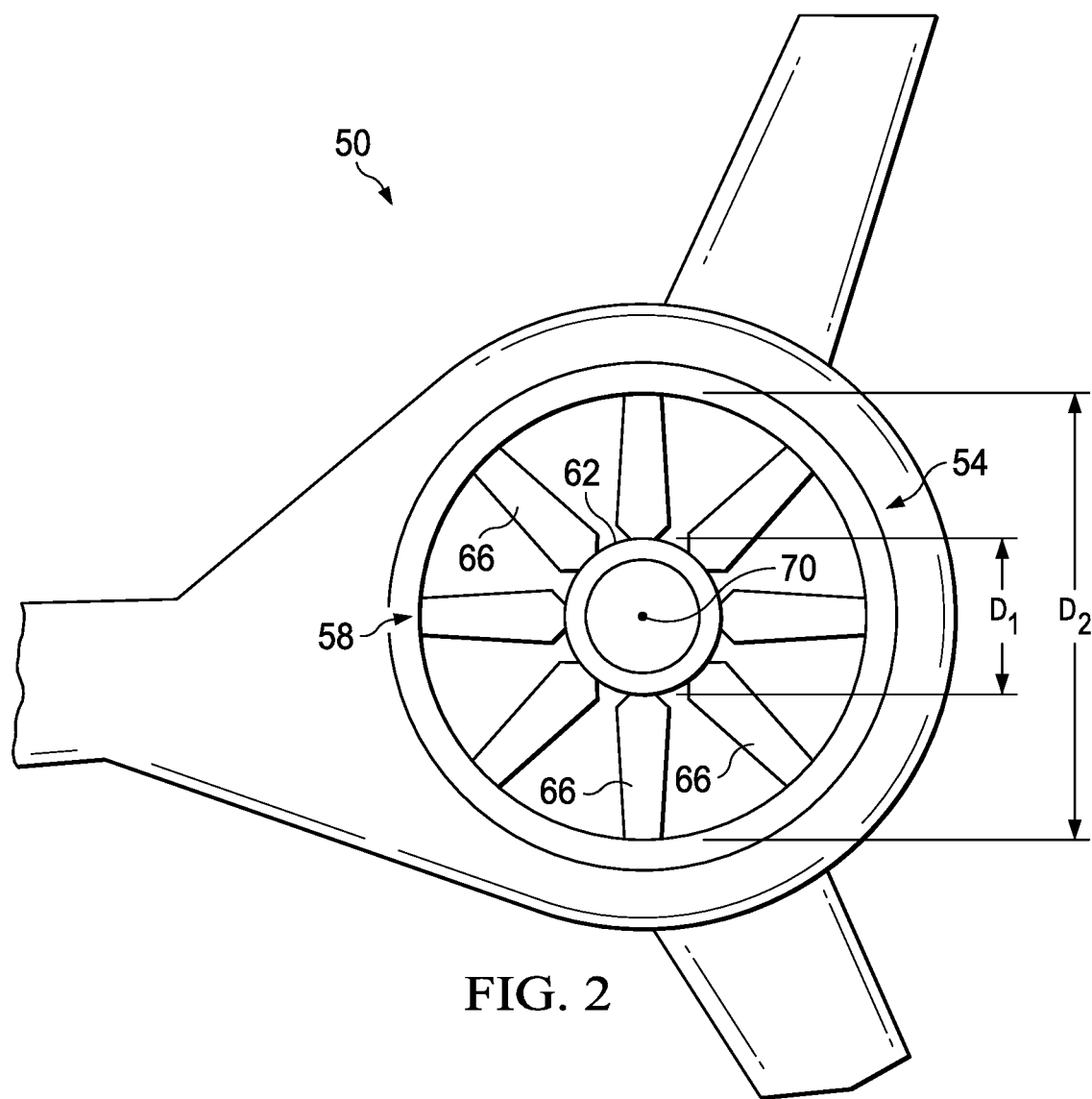
FIG. 2 is a side view of a portion of an aircraft, according to one example embodiment.

As shown in FIGS. 1-2, fuselage rear end 34 of aircraft 10 further includes tail 50, which has rotor system 54. Rotor system 54 can, if activated, counteract torque created by activation of main rotor assembly 38 to, for example, stabilize aircraft 10 and/or prevent aircraft 10 (and, more specifically, fuselage 26) from rotating in the opposite direction that main rotor assembly 38 rotates. In the embodiment shown, rotor system 54 includes rotor assembly 58. Rotor assembly 58 has hub 62 and plurality of rotor blades 66 configured to extend from and rotate about hub 62 (and are depicted extending from hub 62 in the embodiments shown). Both hub 62 and plurality of rotor blades 66 rotate about hub axis 70.

Though not depicted, hub 62 is configured to be coupled to a drive system. The drive system can be, for example, one continuous drive system or a segmented drive system separated by a gearbox, including electric propulsion systems, hydraulic drive systems, or conventional drive systems. For example, hub 62 can be coupled to a drive shaft that is rotated by the drive system such that the drive shaft rotates hub 62, and hub 62 rotates the plurality of rotor blades 66. As shown in FIG. 2, hub 62 is sized to enable hub 62 to accommodate one or more components related to the drive system and/or components related to the coupling of the drive system to hub 62. As one example, rotor assembly 58 would require a tail rotor gearbox to change the torque direction coming from the turbine engine by ninety degrees to deliver torque to hub 62. For example, in the embodiment shown, a diameter $D_1$ of hub 62 is at least 15% (e.g., 15%, 20%, 25%, 30%, 35%, or more) of a diameter $D_2$ of rotor assembly 58.

Figure 3:
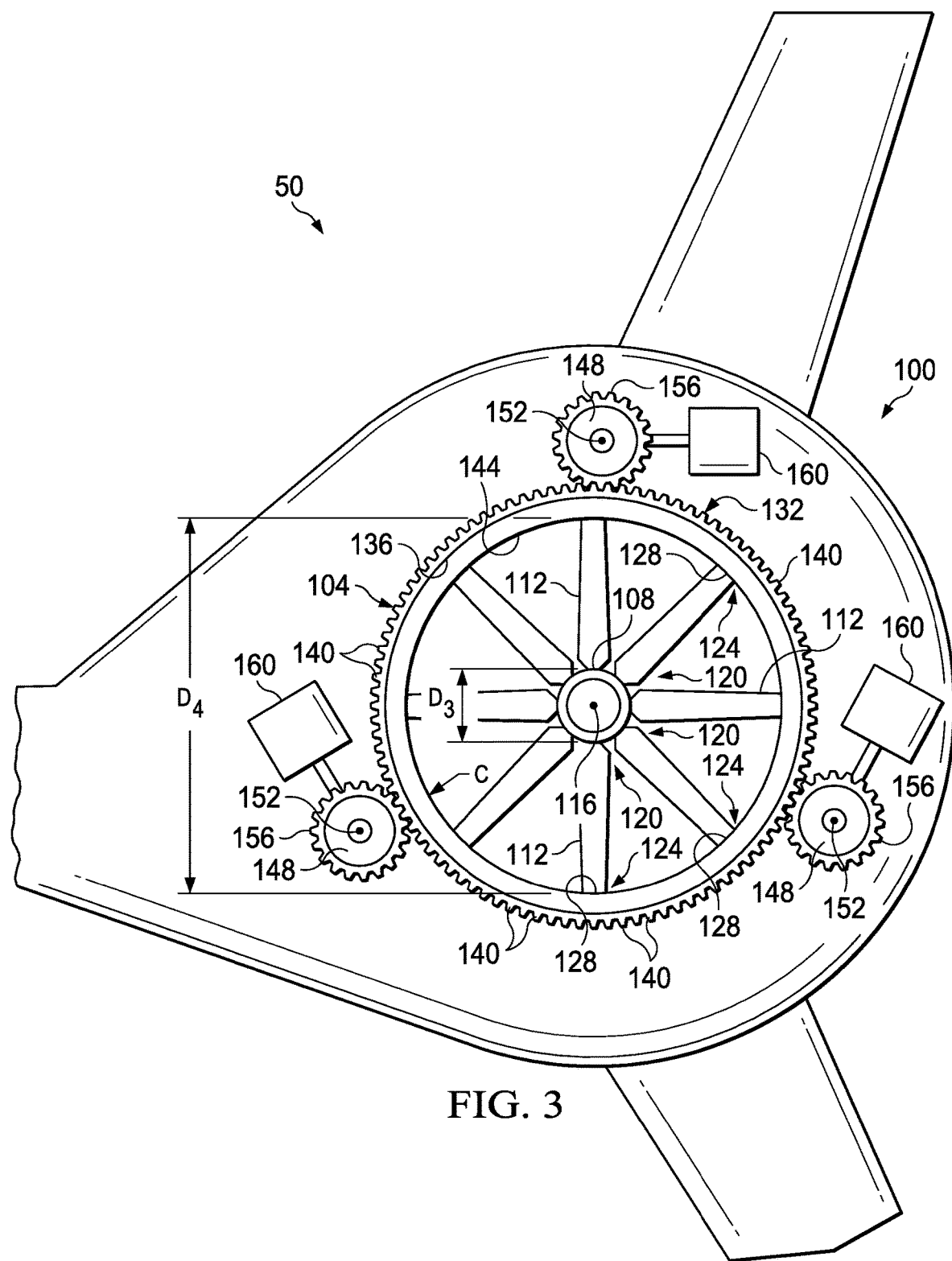
FIG. 3 is a cross-sectional view of a tail portion of an aircraft, according to one example embodiment.

As shown in FIG. 3, tail 50 of aircraft 10 can also be configured to include rotor system 100. Rotor system 100 can, if activated, counteract torque created by activation of main rotor assembly 38 to, for example, stabilize aircraft 10 and/or prevent aircraft 10 (and, more specifically, fuselage 26) from rotating in the opposite direction that main rotor assembly 38 rotates. In the embodiment shown, rotor system 100 includes at least one rotor assembly 104 (e.g., one rotor assembly 104, in the embodiment shown in FIG. 3). Rotor assembly 104 has hub 108 and plurality of rotor blades 112 configured to extend from and rotate about hub 108 (and are depicted extending from hub 108). Both hub 108 and plurality of rotor blades 112 rotate about hub axis 116. As shown in FIG. 3, each of plurality of rotor blades 112 includes inboard portion 120, which is configured to be coupled to hub 108 (and is depicted coupled to hub 108 in the embodiment shown), and outboard portion 124 that ends in blade tip 128. In the embodiment shown, each of plurality of rotor blades 112 extends from hub 108 by substantially the same distance and, therefore, blade tips 128 of plurality of rotor blades 112 collectively define circumference C, which also corresponds to the distance that each blade tip 128 rotates about hub 108, if rotor assembly 104 is rotated.

In the embodiment shown in FIG. 3, hub 108 is not required to be coupled to a drive system and, therefore, hub 108 is not required to be sized to enable hub 108 to accommodate one or more components related to the drive system and/or components related to the coupling of the drive system to hub 108. In other words, rotor system 100 is configured to apply torque to rotate rotor assembly 104 at a position separate from hub 108. For example, in the embodiment shown, a diameter $D_3$ of hub 108 is equal to or less than 20% (e.g., 20%, 15%, 10%, 5%, or less) of a diameter $D_4$ of rotor assembly 104. By comparison, diameter $D_3$ of hub 108 is at least 5% less than (e.g., 5%, 10%, 15%, 20%, 25% less than, or more) diameter $D_1$ of hub 62, if, for example, all other components of aircraft 10 remain substantially equal in size.

Rotor assembly 104 further includes rim 1 (e.g., one rim 132, in the embodiment shown in FIG. 3) that is configured to extend about hub 108 (and is depicted extending about hub 108). Rim 132 is coaxial with hub 108 and rotates about hub axis 116. Rim 132 includes exterior portion 136 with an engagement surface 140 (e.g., gear teeth) disposed thereon. The engagement surface 140 is disposed on the outer circumference surface of the rim 132. In some embodiments, engagement surface 140 is disposed on at least one of the sides of the rim 132. Engagement surface 140 is configured to be coupled to and/or engaged with corresponding teeth of another component (e.g., such as another gear). In some embodiments, the engagement surface 140 is formed substantially in the shape of cylinder to form a cylindrical rim. In other embodiments, the engagement surface 140 is conically shaped to form a conical rim. It should be appreciated that engagement surface 140 may take on a wide variety of configurations suitable for engaging with one or more outer drive gears 148. Rim 132 further includes interior surface 144. Rim 132 (and, more specifically, interior surface 144) and at least one rotor blade of the plurality of rotor blades 112 (e.g., outboard portions 124 and/or blade tips 128) are configured to be coupled to each other (and are depicted coupled to each of other in the embodiment shown in FIG. 3). Interior surface 144 can have substantially the same circumference C as that defined by blade tips 128 of plurality of rotor blades 112 such that rim 132 extends about circumference C.

In some embodiments, rotor assembly 104 does not include a hub 108. In an illustrative embodiment, rotor assembly without a hub 108 can include at least one rotor blade 112 extending from diametrically opposed points on the interior surface 144 of rim 132. In other embodiments, rotor assembly 104 can include a non-rotatable hub 108.

In some embodiments, the rotor assembly 104 can include a unitary portion. For example, rotor assembly 104 (or one or more components of rotor assembly 104, such as one or more of plurality of rotor blades 112, hub 108, and, rim 132) can be formed of the same material and/or at the same time. As one example, rotor assembly 104 could be produced from a single casting or forging and then machined to the final shape. In other embodiments, one or more of outboard portions 124 of plurality of rotor blades 112 are coupled and integral to rim 132 (including at least one of the exterior portion 136, interior surface 144, and engagement surface 140). For example, one or more of plurality of rotor blades 112, such as one or more of blades tips 128, can be coupled to interior surface 144 of rim 132 by fastening and/or by removing a portion of interior surface 144 to accommodate one or more of blade tips 128. As another example, if plurality of rotor blades 112 and interior surface 144 of rim 132 are a unitary member (e.g., made of the same material and/or at the same time), interior surface 144 can be coupled to the exterior portion 136 of rim 132 by, for example, an adhesive and/or by fastening. As still another example, if plurality of rotor blades 112, interior surface 144, and exterior portion 136 of rim 132 are unitary (e.g., made of the same material and/or at the same time), exterior portion 136 can be coupled to engagement surface 140 by, for example, an adhesive and/or fastening. In another example, hub 108 and rim 132 would be fixed together with a plurality of rods that are coaxial with each blade 112, such that each rod passes through the interior of the blades 112. This would allow the blades 112 to pivot about the rod such that blade pitch can be altered by conventional methods. In an embodiment, the rotor assembly 104 can include at least one composite unitary member, metal unitary member, and combinations thereof.

Rotor system 100 further includes one or more outer drive gears 148 (e.g., three outer drive gear 148, in the embodiment shown in FIG. 3). Each of outer drive gears 148 are configured to rotate about outer gear axis 152. Outer gear axis 152 is substantially parallel to the hub axis 116. The outer drive gears 148 can be arranged in a radial pattern about the rotor assembly 104 and are disposed outward of the engagement surface 140, as shown in FIG. 3. Each outer drive gear 148 includes a plurality of teeth 156, which are configured to be coupled to and/or engaged with engagement surface 140 of rim 132, such that, if the engagement surface 140 of rim 132 and plurality of teeth 156 of outer drive gear 148 are coupled and/or engaged, and if outer drive gear 148 are rotated, rim 132 rotates. For example, in the embodiment shown in FIG. 3, if one or more of the outer drive gears 148 are rotated, rim 132 is rotated, and plurality of rotor blades 112 and hub 108 are rotated about hub axis 116. In the embodiment shown in FIG. 3, rotor system 100 is configured such that hub 108 can be rotated only by one or more rims 132 and/or the one or more outer drive gears 148 via one or more of plurality of rotor blades 112 (e.g., and not by one or more conventional drive systems directly coupled to hub 108). In other words, rotor system 100 is configured such that hub 108 can be rotated by one or more of plurality of rotor blades 112, which are rotated by rim 132, which is rotated by at least one outer drive gear 148.

In the embodiment shown in FIG. 3, each of outer drive gears 148 is configured to be coupled to a different power source (e.g., power sources 160), each of which is configured to independently rotate the outer drive gear to which it is coupled. FIG. 3 shows power source 160 to be perpendicular to axis 152, power source 160 can also be coaxial to axis 152. Power sources 160 can include, for example, electric power sources (e.g., electric motors), hydraulic power sources (e.g., hydraulic motors), and/or pneumatic power sources (e.g., pneumatic motors).

In some embodiments, rotor system 100 includes less than three outer drive gears 148 (e.g., two or one outer drive gear 148); and, in other embodiments, rotor system 100 includes more than three outer drive gears 148 (e.g., four, five, six, seven, or more outer drive gears 148). The number and size (e.g., diameter) of outer drive gears 148 in rotor system 100 can depend for example, on a desired maximum and/or fixed speed of rotation for rim 132. For example, in some embodiments, one or more outer drive gears 148 are configured to rotate at least 1.5 times faster than rim 132 (e.g., 1.5 times faster, 2 times faster, 2.5 times faster, 3 times faster, 3.5 times faster, 4 times faster, 4.5 times faster, 5 times faster, or more). The number and size (e.g., diameter) of outer drive gear 148 in rotor system 100 can also depend, for example, on a desired power input for each outer drive gear 148. For example, in some embodiments, if a desired power input for each outer drive gear 148 is low, rotor system 100 may include more outer drive gears 148 and/or smaller-sized (e.g., having smaller diameters) outer drive gears 148; and, if a desired power input for each outer drive gear 148 is high, rotor system 100 may include less outer drive gears 148 and/or larger-sized (e.g., having larger diameters) outer drive gears 148. Rotor system 100 is configured to enable all of outer drive gear 148 to be rotated; and, in some embodiments, fewer than all of outer drive gear 148 can be rotated, such as if one or more of outer drive gear 148 fail, if one or more of outer drive gear 148 are not rotated to conserve power, and/or if one or more outer drive gear 148 are not required to attain a desired maximum and/or fixed speed of rotation for rim 132. In one example, outer drive gear 148 could each include a sprag clutch so that when rotation of outer drive gear 148 is not required, or the gear fails, outer drive gear 148 can free-spin about axis 152. In the illustrative embodiment in FIG. 3, the outer drive gear 148 are shown at substantially equidistant points about the outer circumference of rim 132. In some embodiments, the outer drive gear 148 are disposed at non-equidistant points on the outer circumference of the rim 132.

In operation, the embodiment shown in FIG. 3 can function as follows. A method of operating an aircraft rotor system, such as rotor assembly 104 of rotor system 100 of aircraft 10, can include providing a rotor assembly 104 (e.g., plurality of rotor blades 112, and rim 132, and, optionally, hub 108); providing a drive gear (e.g., at least one outer drive gear 148 having teeth 156) disposed adjacent to the engagement surface 140 of the rim 132 in the rotor assembly 104; and rotating the drive gear having a plurality of teeth (e.g., at least one outer drive gear 148 having teeth 156) to impart rotation to the rotor assembly 104. The method can further include providing and rotating a second drive gear, a third drive gear, a fourth drive gear, a fifth drive gear, a sixth drive gear, and/or a seventh drive gear (e.g., one or more of outer drive gear 148) each having a plurality of teeth that are coupled to the engagement surface 140 of the rim 132 in the rotor assembly 104. Rotating one or more of the outer drive gears 148 and, therefore, rim 132, plurality of rotor blades 112, and hub 108 can include activating one or more power sources (e.g., power sources 160) that are coupled to rotor system 100, such as to one or more of outer drive gear 148.

Figure 4:
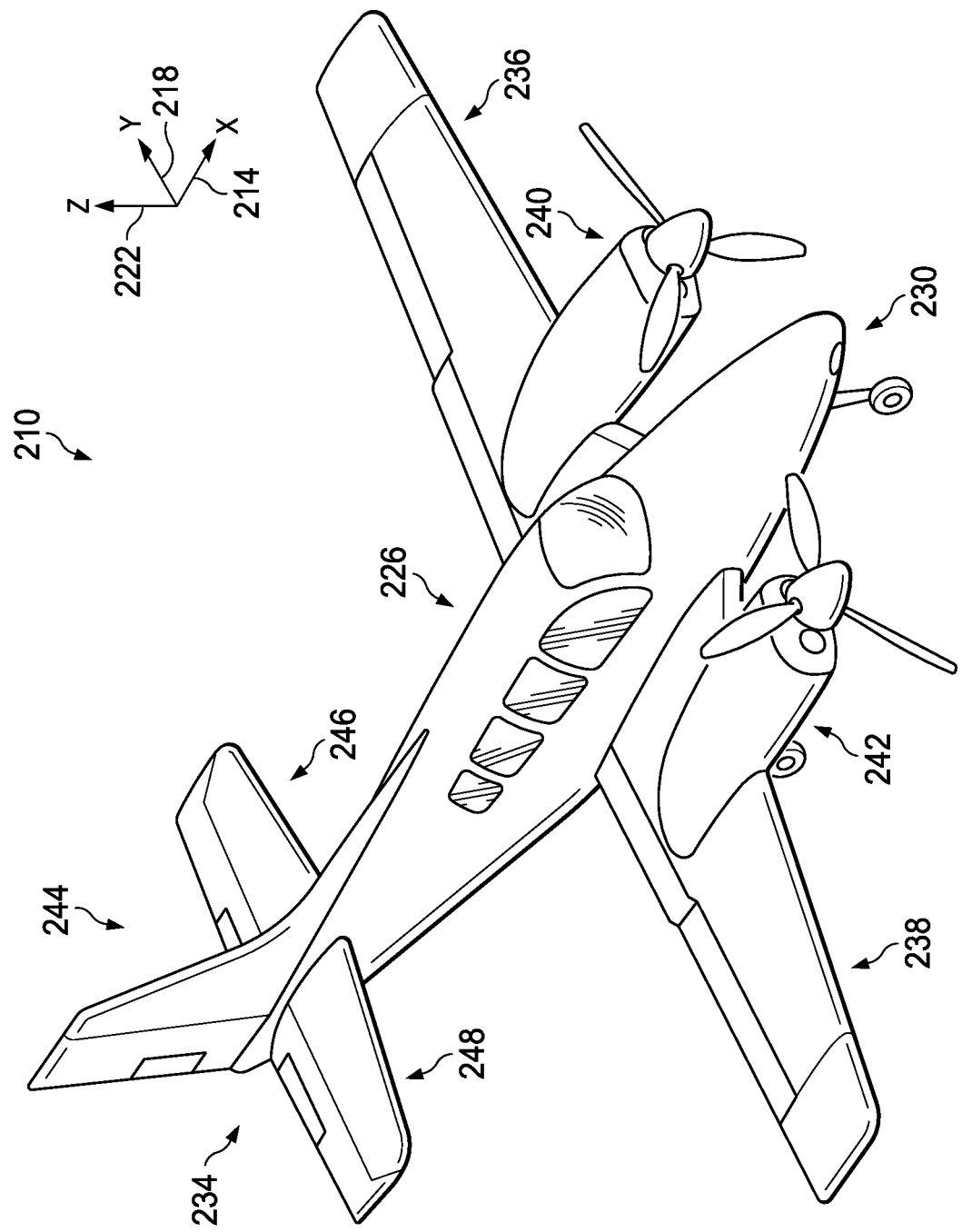
FIG. 4 is a perspective view of another aircraft, according to one example embodiment.

FIG. 4 depicts aircraft 210 and three mutually orthogonal directions X, Y, and Z forming a three-dimensional frame of reference XYZ. Longitudinal axis X 214 extends through the center of aircraft 210 in the fore and aft directions. Transverse axis Y 218 is perpendicular to longitudinal axis. The X-Y plane is considered to be "horizontal." Vertical axis Z 222 is oriented perpendicularly with respect to the X-Y plane. The X-Z plane and Y-Z plane are considered to be "vertical."

Aircraft 210 includes fuselage 226 as a central main body. Fuselage 226 extends parallel to longitudinal axis 214 from a fuselage front end 230 having a cockpit to a fuselage rear end 234. Aircraft 210 includes wing 236 and wing 238 extending from fuselage 226 substantially parallel to transverse axis Y 218. Aircraft 210 further includes propulsion system 240 coupled to wing 236 and propulsion system 242 coupled to wing 238. Fuselage rear end 234 of aircraft 210 also includes tail 244 having tail wing 246 and tail wing 248. Aircraft 210 and components thereof, such as propulsion systems 240 and 242, can, for example, be coupled to and controlled with a power system connected to a drive system, such as one continuous drive system or a segmented drive system separated by a gearbox, including electric propulsion systems, hydraulic drive systems, or conventional drive systems. Propulsion systems 240 and 242 and/or wings 236 and 238 can be controllable and/or positionable to, for example, enable control of direction, thrust, and lift of aircraft 210. For example, propulsion systems 240 and 242 and wings 236 and 238 can provide a forward thrust and a lifting thrust to aircraft 210 during takeoff, during flight, and during landing.

Figure 5:
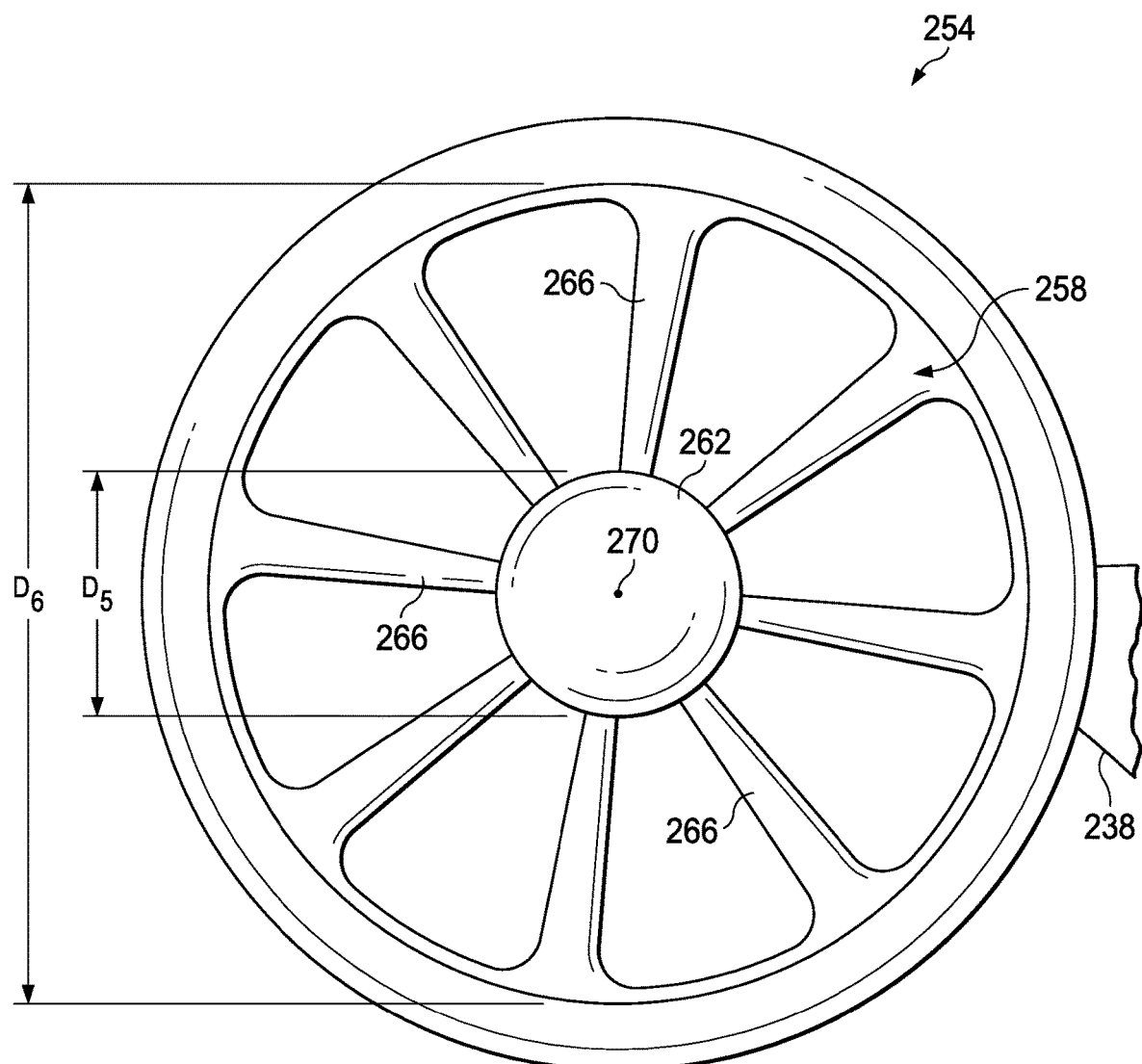
FIG. 5 is a front view of a rotor system for an aircraft, according to one example embodiment.

As shown in FIG. 5, propulsion system 242 can include rotor system 254 in lieu of a traditional propeller system as shown in FIG. 4. Though not depicted, propulsion system 240 can similarly include rotor system 254. Rotor system 254 can, if activated, provide forward thrust to aircraft 210 to enable aircraft 210 to takeoff, fly, and land. In the embodiment shown, rotor system 254 includes rotor assembly 258. Rotor assembly 258 has hub 262 and plurality of rotor blades 266 configured to extend from and rotate about hub 262 (and are depicted extending from hub 262 in the embodiments shown). Both hub 262 and plurality of rotor blades 266 rotate about hub axis 270.

Though not depicted, hub 262 is configured to be coupled to a drive system. The drive system can be, for example, one continuous drive system or a segmented drive system separated by a gearbox, including electric propulsion systems, hydraulic drive systems, or conventional drive systems. For example, hub 262 can be coupled to a drive shaft that is rotated by the drive system such that the drive shaft rotates hub 262, and hub 262 rotates the plurality of rotor blades 266. As shown in FIG. 5, hub 262 is sized to enable hub 262 to accommodate one or more components related to the drive system and/or components related to the coupling of the drive system to hub 262. For example, in the embodiment shown, a diameter $D_5$ of hub 262 is at least 15% (e.g., 15%, 20%, 25%, 30%, 35%, or more) of a diameter $D_6$ of rotor assembly 258.

Figure 6:
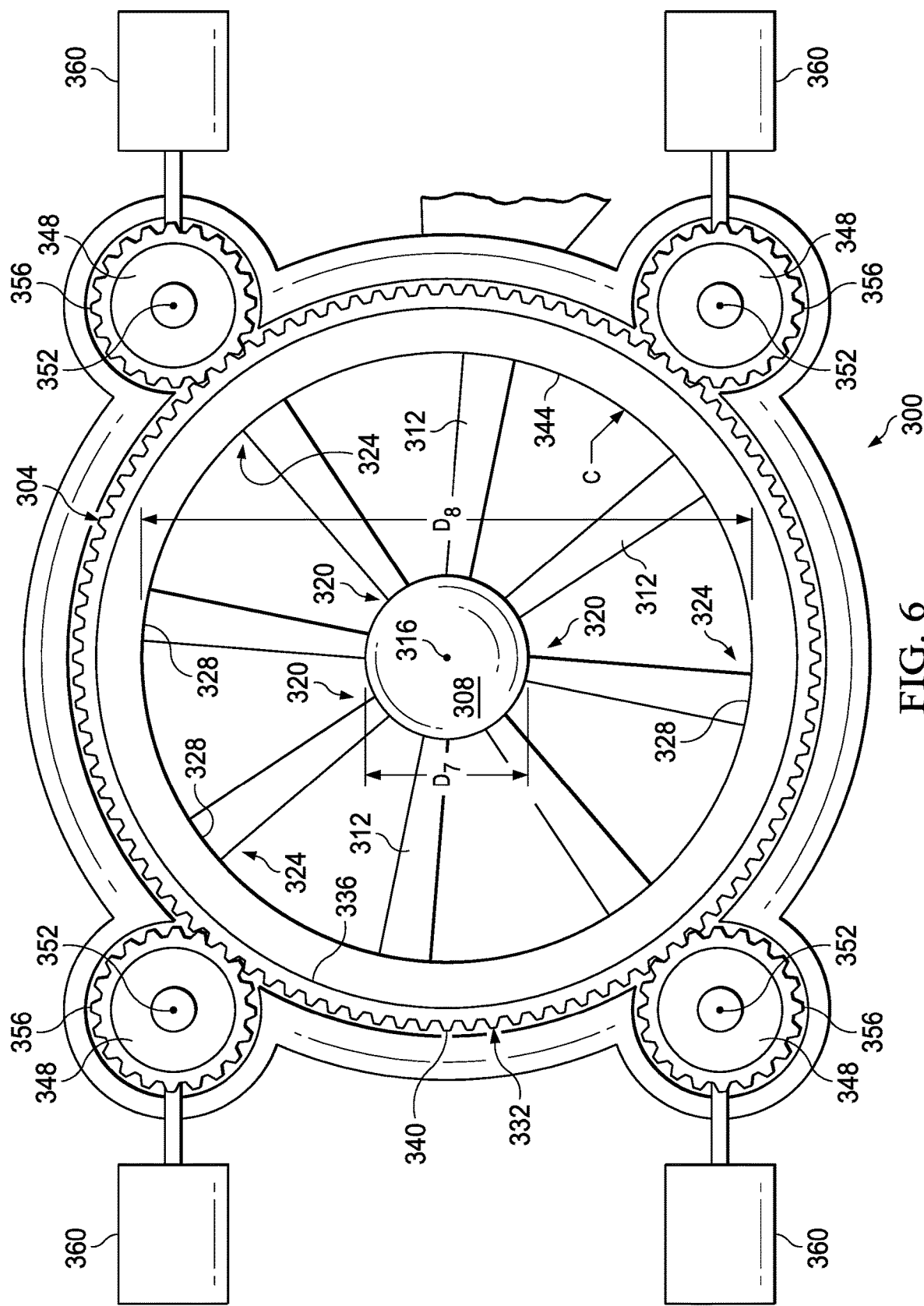
FIG. 6 is a cross-sectional view of a rotor system of an aircraft, according to one example embodiment.

As shown in FIG. 6, propulsion system 242 can be configured to include rotor system 300. Though not depicted, propulsion system 240 can similarly be configured to include rotor system 300. Certain components of rotor system 300 are as described above in connection with rotor system 100. Those components bear similar reference characters to the components of rotor system 100, but with a leading "3" rather than a leading '1'. Rotor system 300 can, if activated, provide forward thrust to aircraft 210 to enable aircraft 210 to takeoff, fly, and land. In the embodiment shown, rotor system 300 includes at least one rotor assembly 304 (e.g., one rotor assembly 304, in the embodiment shown in FIG. 6). Rotor assembly 304 has hub 308 and plurality of rotor blades 312 configured to extend from and rotate about hub 308 (and are depicted extending from hub 308). Both hub 308 and plurality of rotor blades 312 rotate about hub axis 316. As shown in FIG. 6, each of plurality of rotor blades 312 includes inboard portion 320, which is configured to be coupled to hub 308 (and is depicted coupled to hub 308 in the embodiment shown), and outboard portion 324 that ends in blade tip 328. In the embodiment shown, each of plurality of rotor blades 312 extends from hub 308 by substantially the same distance and, therefore, blade tips 328 of plurality of rotor blades 312 collectively define circumference C, which also corresponds to the distance that each blade tip 328 rotates about hub 308, if rotor assembly 304 is rotated.

In the embodiment shown in FIG. 6, hub 308 is not required to be coupled to a drive system and, therefore, hub 308 is not required to be sized to enable hub 308 to accommodate one or more components related to the drive system and/or components related to the coupling of the drive system to hub 308. In other words, rotor system 300 is configured to apply torque to rotate rotor assembly 304 at a position separate from hub 308. For example, in the embodiment shown, a diameter $D_7$ of hub 308 is equal to or less than 20% (e.g., 20%, 15%, 10%, 5%, or less) of a diameter $D_8$ of rotor assembly 304. By comparison, diameter $D_7$ of hub 308 is at least 5% less than (e.g., 5%, 10%, 15%, 20%, 25% less than, or more) diameter $D_5$ of hub 262, if, for example, all other components of aircraft 210 remain substantially equal in size.

Rotor assembly 304 further includes rim 332 (e.g., one rim 332, in the embodiment shown in FIG. 6) that is configured to extend about hub 308 (and is depicted extending about hub 308). Rim 332 is coaxial with hub 308 and rotates about hub axis 316. Rim 332 includes an exterior portion 336 with an engagement surface 340 (e.g., gear teeth), which is configured to be coupled to and/or engaged with corresponding teeth of another component (e.g., such as another gear) as described herein. Rim 332 further includes interior surface 344. Rim 332 (and, more specifically, interior surface 344) and at least one rotor blade of the plurality of rotor blades 312 (e.g., outboard portions 324 and/or blade tips 328) are configured to be coupled to each other (and are depicted coupled to each of other in the embodiment shown in FIG. 6). Interior surface 344 can have substantially the same circumference C as that defined by blade tips 328 of plurality of rotor blades 312 such that rim 332 extends about circumference C.

Rotor system 300 further includes one or more outer drive gears 348 (e.g., four outer drive gear 348, in the embodiment shown in FIG. 6). Each of the outer drive gears 348 are configured to rotate about outer gear axis 352. Each of the outer drive gears 348 includes a plurality of teeth 356, which are configured to be coupled to and/or engaged with engagement surface 340 of rim 332, such that, if engagement surface 340 of rim 332 and plurality of teeth 356 of outer drive gear 348 are coupled and/or engaged, and if one of rim 332 or outer drive gear 348 is rotated, the other of rim 332 or outer drive gear 348 rotates. For example, in the embodiment shown in FIG. 6, if one or more of outer drive gears 348 are rotated, rim 332 is rotated, and plurality of rotor blades 312 and hub 308 are rotated about hub axis 316. In the embodiment shown in FIG. 6, rotor system 300 is configured such that hub 308 can be rotated only by one or more rims 332 and/or one or more outer drive gear 348 via one or more of plurality of rotor blades 312 (e.g., and not by one or more traditional drive systems coupled directly to hub 308). In other words, rotor system 300 is configured such that hub 308 can be rotated by one or more of plurality of rotor blades 312, which are rotated by rim 332, which is rotated by at least one outer drive gear 348.

In some embodiments, rotor system 300 includes less than four outer drive gears 348 (e.g., three, two, or one outer drive gear 348); and, in other embodiments, rotor system 300 includes more than three outer drive gears 348 (e.g., five, six, seven, or more outer drive gear 348). The number and size (e.g., diameter) of the outer drive gears 348 in rotor system 300 can depend for example, on a desired maximum and/or fixed speed of rotation for rim 332. In an embodiment, one or more outer drive gears can be a plurality of outer drive gears 348. For example, in some embodiments, one or more outer drive gears 348 are configured to rotate at least 1.5 times faster than rim 332 (e.g., 1.5 times faster, 2 times faster, 2.5 times faster, 3 times faster, 3.5 times faster, 4 times faster, 4.5 times faster, 5 times faster, or more). The number and size (e.g., diameter) of the outer drive gears 348 in rotor system 300 can also depend, for example, on a desired power input for each outer drive gear 348. For example, in some embodiments, if a desired power input for each outer drive gear 348 is low, rotor system 300 may include more outer drive gears 348 and/or smaller-sized (e.g., having smaller diameters) outer drive gears 348; and, if a desired power input for each outer drive gear 348 is high, rotor system 300 may include less outer drive gears 348 and/or larger-sized (e.g., having larger diameters) outer drive gears 348. Rotor system 300 is configured to enable all of the outer drive gears 348 to be rotated; and, in some embodiments, fewer than all of outer drive gear 348 can be rotated, such as if one or more of outer drive gear 348 fail, if one or more of outer drive gear 348 are not rotated to conserve power, and/or if one or more outer drive gear 348 are not required to attain a desired maximum and/or fixed speed of rotation for rim 332. In one example, outer drive gear 348 could each include a sprag clutch so that when rotation of outer drive gear 348 is not required, or the gear fails, outer drive gear 348 can free-spin about axis 352. In the embodiment shown, there can be two pairs of diametrically opposed outer drive gear 348.

In operation, the embodiment shown in FIG. 6 can function as follows. A method of operating an aircraft rotor system, such as rotor assembly 304 of rotor system 300 of aircraft 210, can include providing a rotor assembly 304 (e.g., plurality of rotor blades 312, and rim 332, and, optionally, hub 308); providing a drive gear (e.g., at least one outer drive gear 348 having teeth 356) disposed adjacent to the engagement surface 340 of the rim 332 in the rotor assembly 304; and rotating the drive gear having a plurality of teeth (e.g., at least one outer drive gear 348 having teeth 356) to impart rotation to the rotor assembly 304. The method can further include providing and rotating a second drive gear, third drive gear, a fourth drive gear, a fifth drive gear, a sixth drive gear, and/or a seventh drive gear (e.g., one or more outer drive gears 348) each having a plurality of teeth that are coupled to the engagement surface 340 of the rim 332 of in the rotor assembly 304. Rotating one or more of outer drive gear 348 and, therefore, rim 332, plurality of rotor blades 312, and hub 308 can include activating one or more power sources (e.g., power sources 360) that are coupled to rotor system 300, such as to one or more of outer drive gear 348.

Figure 7:
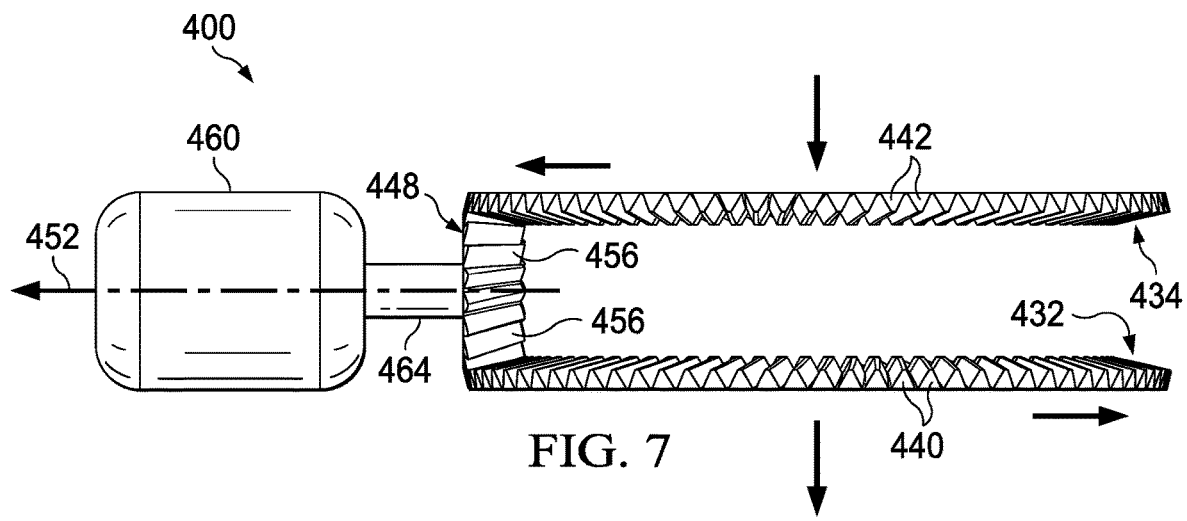
FIG. 7 is a top view of a portion of a rotor system, according to one example embodiment.
Figure 8:
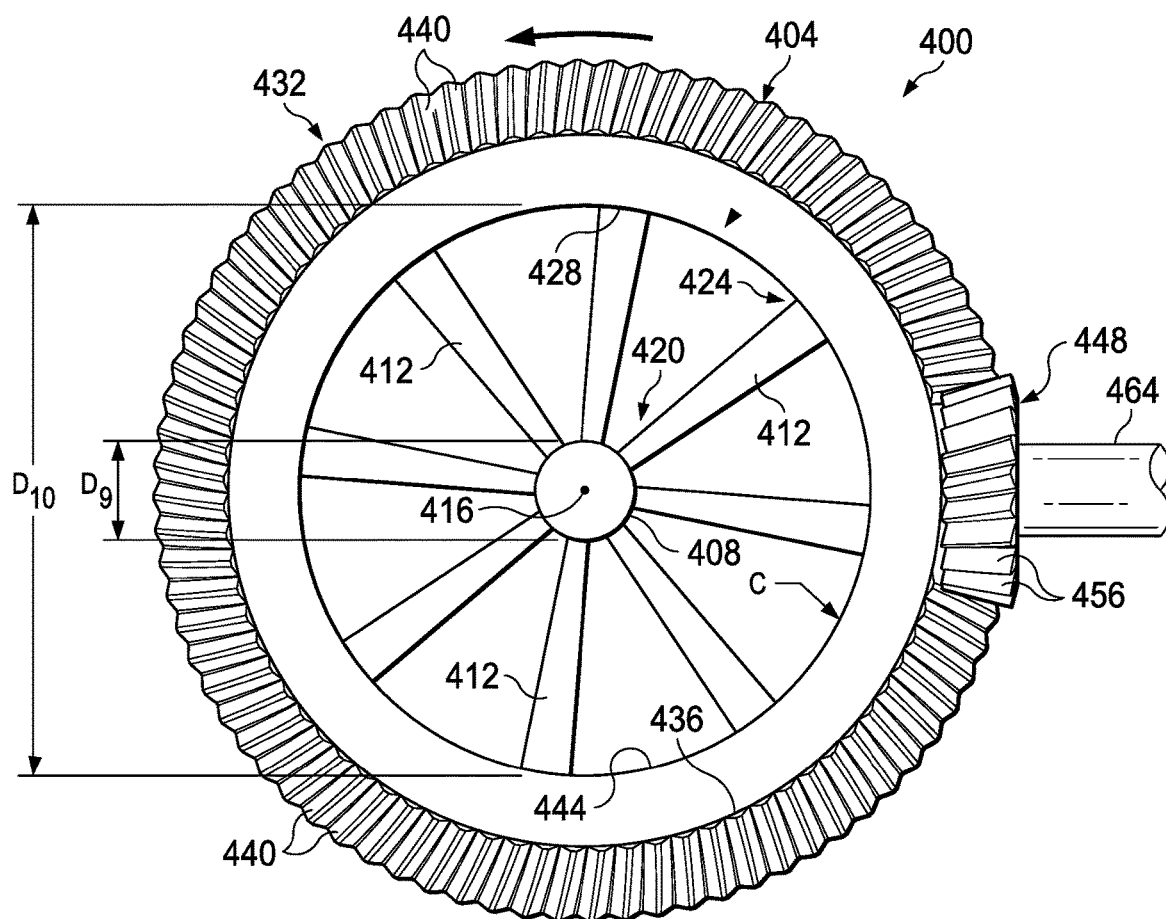
FIG. 8 is a side view of a portion of a rotor system, according to one example embodiment.
Figure 9:
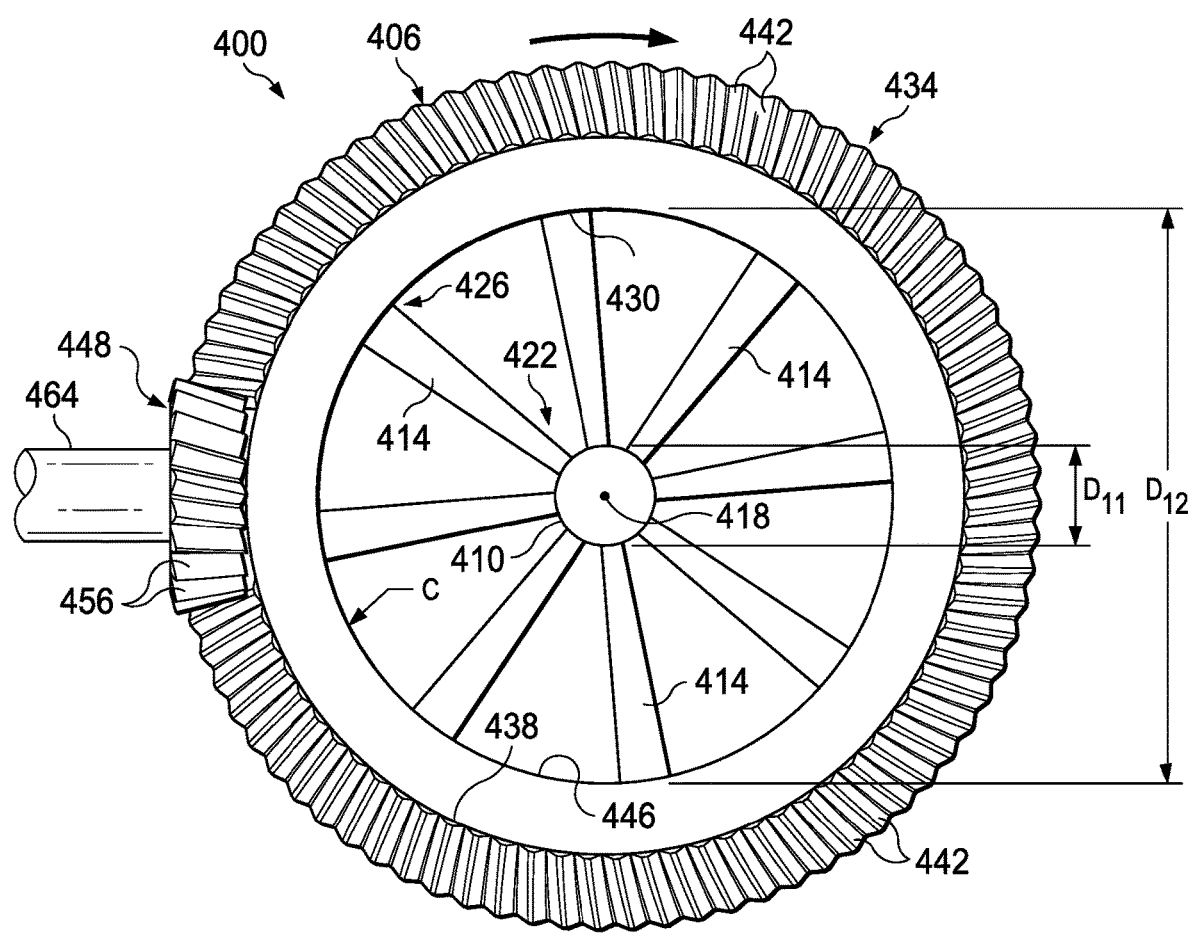
FIG. 9 is a side view of a portion of a rotor system, according to one example embodiment.

FIGS. 7-9 depict another embodiment of the present rotor systems. Rotor system 400 can, if activated, provide thrust with contra-rotating rotor assemblies to assist in enabling an aircraft to takeoff, fly, and land. Rotor system 400 can be used, for example, in any VTOL aircraft, such as a hovercraft, and does not require a separate rotor assembly to counteract torque because the contra-rotating rotor assemblies of rotor assembly 400 can operate in a configuration that does not produce a torque to counteract. In the embodiment shown, rotor system 400 includes at least two rotor assemblies (e.g., first and second rotor assemblies 404 and 406, in the embodiment shown in FIGS. 7-9). Certain components of the rotor system 400 are as described above in connection with rotor systems 100, 200, 300 and bear similar reference characters but with a leading '4'. First rotor assembly 404 has first hub 408, and second rotor assembly 406 has second hub 410. First rotor assembly 404 further includes first plurality of rotor blades 412 configured to extend from and rotate about first hub 408 (and are depicted extending from first hub 408). Both first hub 408 and first plurality of rotor blades 412 rotate about first hub axis 416. Similarly, second rotor assembly 406 further includes second plurality of rotor blades 414 configured to extend from and rotate about second hub 410 (and are depicted extending from second hub 410). Both second hub 410 and second plurality of rotor blades 414 rotate about second hub axis 418. As shown in FIG. 8, each of the first plurality of rotor blades 412 includes inboard portion 420, which is configured to be coupled to first hub 408 (and is depicted coupled to first hub 408 in the embodiment shown), and outboard portion 424 that ends in blade tip 428. In the embodiment shown in FIG. 8, each of first plurality of rotor blades 412 extends from first hub 408 by substantially the same distance and, therefore, blade tips 428 of plurality of rotor blades 412 collectively define circumference C, which also corresponds to the distance that each blade tip 428 rotates about first hub 408, if first rotor assembly 404 is rotated. Similarly, as shown in FIG. 9, each of the second plurality of rotor blades 414 includes inboard portion 422, which is configured to be coupled to second hub 410 (and is depicted coupled to hub 410 in the embodiment shown), and outboard portion 426 that ends in blade tip 430. In the embodiment shown in FIG. 9, each of the second plurality of rotor blades 414 extends from second hub 410 by substantially the same distance and, therefore, blade tips 430 of plurality of rotor blades 414 collectively define circumference C, which also corresponds to the distance that each blade tip 430 rotates about second hub 410, if second rotor assembly 406 is rotated.

In the embodiment shown in FIGS. 7-9, first and second hubs 408, 410 are not required to be coupled to a drive system and, therefore, hubs 408, 410 are not required to be sized to enable hubs 408, 410 to accommodate one or more components related to the drive system and/or components related to the coupling of the drive system to hubs 408, 410. In other words, rotor system 400 is configured to apply torque to rotate first rotor assembly 404 and second rotor assembly 406 at a position separate from first and second hubs 408, 410, respectively. For example, in the embodiment shown, a diameter $D_9$ of first hub 408 is equal to or less than 20% (e.g., 20%, 15%, 10%, 5%, or less) of a diameter $D_{10}$ of first rotor assembly 404. Similarly, a diameter $D_{11}$ of second hub 410 is equal to or less than 20% (e.g., 20%, 15%, 10%, 5%, or less) of a diameter $D_{12}$ of second rotor assembly 406.

Rotor system 400 further includes at least two rims (e.g., first and second rims 432 and 434, in the embodiment shown in FIGS. 7-9). First rim 432 is configured to extend about hub 408 (and is depicted extending about first hub 408), and second rim 434 that is configured to extend about hub 410 (and is depicted extending about second hub 410). First rim 432 is coaxial with first hub 408 and rotates about first hub axis 416, and second rim 434 is coaxial with second hub 410 and rotates about second hub axis 418. First rim 432 includes first exterior portion 436, and second rim 434 includes second exterior portion 438. Further, first exterior portion 436 of first rim 432 includes a first engagement surface 440 (e.g., gear teeth), which configured to be coupled to and/or engaged with corresponding teeth of another component (e.g., such as another gear) as described herein. Similarly, second exterior portion 438 of second rim 434 includes second engagement surface 442 (e.g., gear teeth), which are configured to be coupled to and/or engaged with corresponding teeth of another component (e.g., such as another gear) as described herein. First rim 432 further includes a first interior surface 444. First rim 432 (and, more specifically, first interior surface 444) and at least one rotor blade of the first plurality of rotor blades 412 (e.g., outboard portions 424 and/or blade tips 428) are configured to be coupled to each other (and are depicted coupled to each of other in the embodiment shown in FIG. 8). First interior surface 444 can have substantially the same circumference C as that defined by blade tips 428 of the first plurality of rotor blades 412 such that first rim 432 extends about circumference C. Similarly, second rim 434 further includes second interior surface 446. Second rim 434 (and, more specifically, second interior surface 446) and at least one rotor blade of the second plurality of rotor blades 414 (e.g., outboard portions 426 and/or blade tips 430) are configured to be coupled to each other (and are depicted coupled to each other in the embodiment shown in FIG. 9). Second interior surface 446 can have substantially the same circumference C as that defined by blade tips 430 of plurality of rotor blades 414 such that second rim 434 extends about circumference C.

Rotor system 400 further includes at least one outer drive gear 448 (e.g., one outer drive gear 448, in the embodiment shown in FIGS. 7-9). Outer drive gear 448 is configured to rotate about outer gear axis 452. In some embodiments, outer drive gear 448 can be at least one of the following: a spiral bevel gear, a bevel gear, and a face gear. Outer drive gear 448 includes plurality of teeth 456, which are configured to be coupled to and/or engaged with first engagement surface 440 of first rim 432 and second engagement surface 442 of second rim 434, such that, if first engagement surface 440 of first rim 432 and plurality of teeth 456 of outer drive gear 448 are coupled and/or engaged, and if outer drive gear 448 is rotated, the first rim 432 rotates; and, similarly, if second engagement surface 442 of second rim 434 and plurality of teeth 456 of outer drive gear 448 are coupled and/or engaged, and if outer drive gear 448 is rotated, the second rim 434 rotates. For example, in the embodiment shown in FIGS. 7-9, if outer drive gear 448 is rotated, first rim 432 is rotated, first plurality of rotor blades 412 and first hub 408 are rotated about first hub axis 416 in a first direction, second rim 434 is rotated, and second plurality of rotor blades 414 and second hub 410 are rotated about second hub axis 418 in a second direction, and the first direction and the second direction are different. In other words, rotor system 400 enables first rotor assembly 404 and second rotor assembly 406 to be rotated in different (e.g., opposite) directions to produce thrust in a direction perpendicular to outer gear axis 452 and parallel to first hub axis 416 and second hub axis 418. In the embodiment shown in FIGS. 7-9, rotor system 400 is configured such that first hub 408 can be rotated only by one or more first rims 432 and/or one or more outer drive gear 448 via one or more of first plurality of rotor blades 412 (e.g., and not by one or more traditional drive systems coupled directly to first hub 408). In other words, rotor system 400 is configured such that first hub 408 can be rotated by one or more of first plurality of rotor blades 412, which are rotated by first rim 432, which is rotated by at least one outer drive gear 448. Similarly, rotor system 400 is configured such that second hub 410 can be rotated only by one or more second rims 434 and/or one or more outer drive gear 448 via one or more of second plurality of rotor blades 414 (e.g., and not by one or more traditional drive systems directly coupled to second hub 410). In other words, rotor system 400 is configured such that second hub 410 can be rotated by one or more of second plurality of rotor blades 414, which are rotated by second rim 434, which is rotated by at least one outer drive gear 448.

In the embodiment shown in FIGS. 7-9, outer drive gear 448 is configured to be coupled to power source 460 by shaft 464. In other embodiments that include more than one outer drive gear 448, one or more of outer drive gear 448 are configured to be coupled to independent power sources to enable independent rotation of each outer drive gear 448, or to the same power source that is configured to rotate one or more of outer drive gear 448. Power sources 460 can include, for example, electric power sources (e.g., electric motors), hydraulic power sources (e.g., hydraulic motors), pneumatic power sources (e.g., pneumatic motors), and/or power sources configured to use air moving around and/or through rotor system 400 to provide power to outer drive gear 448.

In some embodiments, rotor system 400 includes more than one outer drive gears 448 (e.g., two, three, four, five, six, or more outer drive gear 448). In some embodiments, rotor system 400 includes less than two rims (e.g., only rim 432); and in other embodiments, rotor system 400 includes more than two rims (e.g., three, four, five, six, or more rims). The number and size (e.g., diameter) of outer drive gears 448 in rotor system 400 can depend for example, on a desired maximum and/or fixed speed of rotation for first and second rims 432 and 434. For example, in some embodiments, outer drive gear 448 is configured to rotate at least 1.5 times faster than rims 432 and 434 (e.g., 1.5 times faster, 2 times faster, 2.5 times faster, 3 times faster, 3.5 times faster, 4 times faster, 4.5 times faster, 5 times faster, or more). The number and size (e.g., diameter) of one or more outer drive gears 448 in rotor system 400 can also depend, for example, on a desired power input for one or more outer drive gears 448. For example, in some embodiments, if a desired power input for one or more outer drive gears 448 is low, rotor system 400 may include more outer drive gears 448 and/or smaller-sized (e.g., having smaller diameters) outer drive gears 448; and, if a desired power input for one or more outer drive gear 448 is high, rotor system 400 may include less outer drive gears 448 and/or larger-sized (e.g., having larger diameters) outer drive gears 448. In an embodiment that includes one or more outer drive gears 448, rotor system 400 is configured to enable all of outer drive gears 448 to be rotated; and, in some embodiments, fewer than all of outer drive gears 448 can be rotated, such as if one or more of outer drive gears 448 fail, if one or more of outer drive gears 448 are not rotated to conserve power, and/or if one or more outer drive gears 448 are not required to attain a desired maximum and/or fixed speed of rotation for first and second rims 432, 434. In one example, outer drive gear 448 could each include a sprag clutch so that when rotation of outer drive gear 448 is not required, or the gear fails, outer drive gear 448 can free-spin about axis 452.

In operation, the embodiment shown in FIGS. 7-9 can function as follows. A method of operating an aircraft rotor system, such as rotor assemblies 404 and 406 of rotor system 400, can include providing a first rotor assembly 404 (e.g., plurality of rotor blades 412, and rim 432, and, optionally, hub 408); providing a second rotor assembly 406 (e.g., plurality of rotor blades 414, and rim 434, and, optional, hub 410); providing a first drive gear (e.g., at least one outer drive gear 448 having teeth 456) disposed adjacent to the first engagement surface 440 of the first rim 432 and the second engagement surface 442 of the second rim 434; and rotating the drive gear having a plurality of teeth (e.g., at least one outer drive gear 448 having teeth 456) to impart rotation to the first rotor assembly 404 and second rotor assembly 406. The method can further include rotating a second drive gear, a third drive gear, a fourth drive gear, a fifth drive gear, a sixth drive gear, and/or a seventh drive gear (e.g., one or more of outer drive gear 448) each having a plurality of teeth that are coupled to the first and second engagements surfaces 440, 442 of the first and second rims 404, 406. Rotating one or more of outer drive gear 448 and, therefore, first and second rotor assemblies 404, 406, can include activating one or more power sources (e.g., power sources 460) that are coupled to rotor system 400, such as to one or more of outer drive gear 448. In some embodiments, the first plurality of rotor blades 412 and the second plurality of rotor blades 414 rotate in a different direction (e.g., opposite directions) to, for example, produce thrust in a direction perpendicular to outer gear axis 452 and parallel to first hub axis 416 and second hub axis 418.

Figure 10:
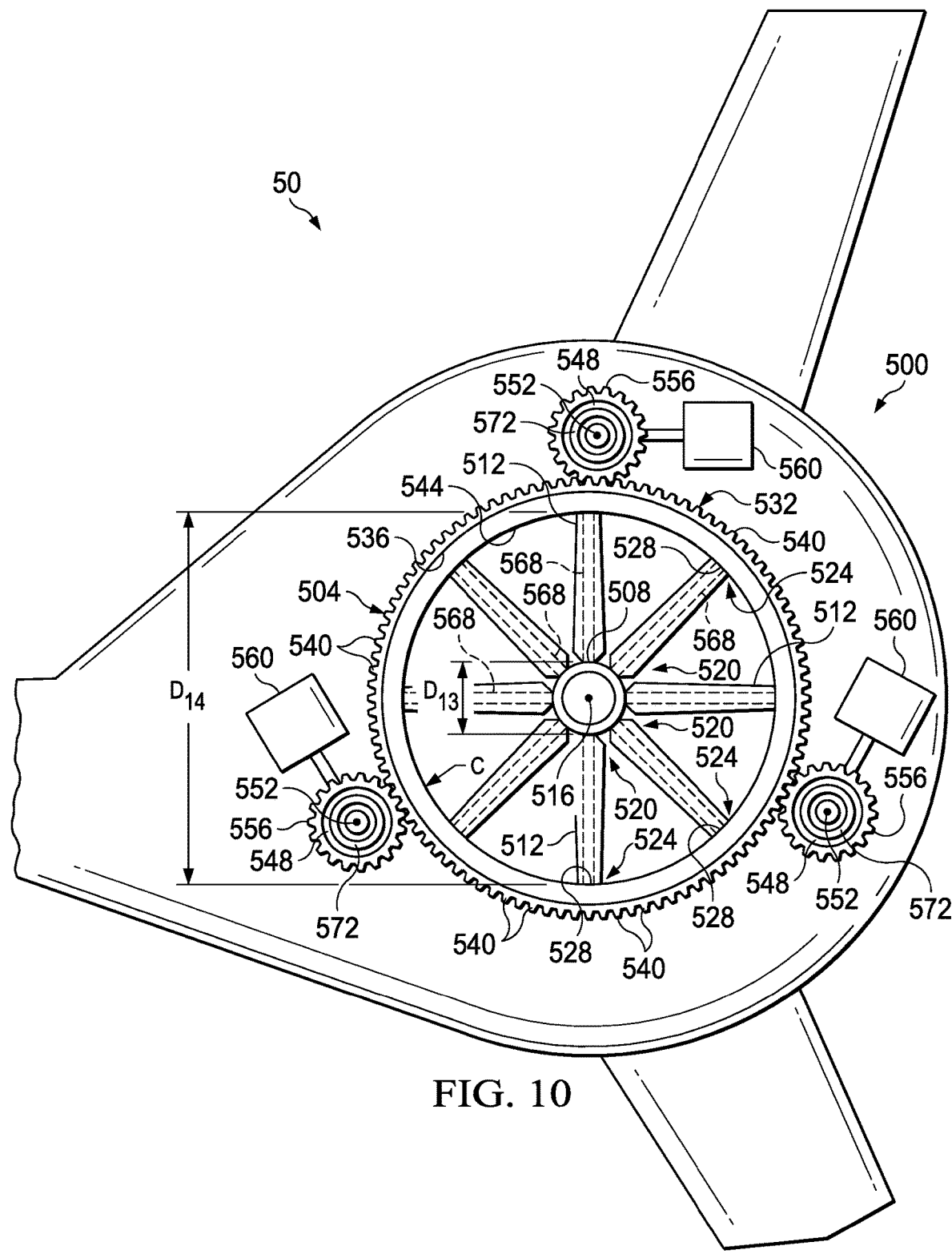
FIG. 10 is a cross-sectional view of a rotor system of an aircraft, according to one example embodiment.

FIG. 10 depicts another embodiment of the present rotor systems. Rotor system 500 includes the same or similar components of rotor systems 100 as described with respect to FIG. 3. Those components include the same or similar characteristics, features, and advantages as the components of FIG. 3 and bear similar reference characters, but with a leading "5" rather than a leading "1." Furthermore, the dimensional components of rotor system 500, such as circumference C, $D_{13}$, and $D_{14}$ of rotor system 500 include the same or similar characteristics, features, and advantages as circumference C, $D_3$, and $D_4$ of FIG. 3, respectively.

In the embodiment shown in FIG. 10, rotor system 500 further includes rods 568. Each rod 568 extends from hub 508 to rim 532. In some embodiments, rods 568 can be coupled to one or both of hub 508 and rim 532 (e.g., by adhesive, fastening, such as with a mechanical attachment, and/or by removing a portion of interior surface 544 to accommodate one or more of blade tips 528); and, in other embodiments, rods 568 can be unitary with one or both of hub 508 and rim 532 (e.g., made of the same material and/or at the same time). In the embodiment shown, each rod 568 is coaxial with a corresponding blade 512, and each rod 568 passes through the interior of the corresponding blade 512. Rotor system 500 is configured such that each blade 512 can pivot about a corresponding rod 568 to, for example, adjust blade pitch (e.g., such as through conventional blade pitch adjustment methods).

In the embodiment shown in FIG. 10, rotor system 500 further includes clutches 572, which can be, for example, sprag clutches. Outer drive gear 548 can each include clutch 572. If rotation of one or more of outer drive gear 548 is not required, or if one or more of outer drive gear 548 fail, clutches 572 can enable free-spin of such outer drive gear 548 about axis 552 to, for example, enable rotor assembly 504 to continue rotating at desirable in-flight speeds.

FIGS. 11-18 depict another embodiment of the present rotor systems. Rotor system 600 provides pitch control for externally driven rotor blades. Rotor system 600 generates a variable thrust output by the externally driven rotor blades without requiring a mast to rotate the hub and associated rotor blades. In some embodiments, the rotor system 600 provides collective pitch control of externally driven rotor blades. Certain components of the rotor system 600 are as described above in connection with rotor systems 100, 200, 300, 400, 500 and bear similar reference characters but with a leading '6'. Rotor system 600 includes a rotor assembly 604 and a driving member 647. In some embodiments, rotor system 600 includes a plurality of rotor assemblies 604 (e.g., a first rotor assembly, a second rotor assembly, etc.). The rotor assembly 604 includes a hub 608 having a hub axis 616, an externally driven rim 631, a plurality of rotor blade assemblies 612*a*, and a pitch control mechanism 678. Hub axis 616 can be parallel to the longitudinal axis and/or transverse axes 14, 18 of the aircraft 10 in some embodiments (e.g., disposed on a X-Y or horizontal plane as described herein). In some embodiments, hub axis 616 can be parallel to the vertical axis Z 22 (e.g., disposed on a Y-Z vertical plane). The driving member 647 exclusively drives the externally driven rim 631 in rotation about a hub axis 616 (e.g., the hub 608 does not include a conventional mast for imparting rotation thereon).

The driving member 647 receives power from a power source and is configured to provide a rotational energy to the externally driven rim 631 for rotation about the hub axis 616. In an embodiment, the power source is mechanical, hydraulic, and/or electric. The amount of rotational energy provided by the driving member 647 may be regulated by controlling the amount of energy from the power source. In an exemplary embodiment, the power source causes the driving member 647 to rotate about a driving member axis 652*a* and the rotational energy thereby transmitted to the externally driven rim 631 is a mechanical energy. It should be appreciated that the driving member 647 can provide a rotational energy to the externally driven rim 631 in a wide variety of configurations, for example, but not limitation, rotational energy from magnetic energy and electromagnetic energy. Accordingly, in some embodiments, the driving member 647 and externally driven rim 631 do not require engagement therebetween.

Figure 12:
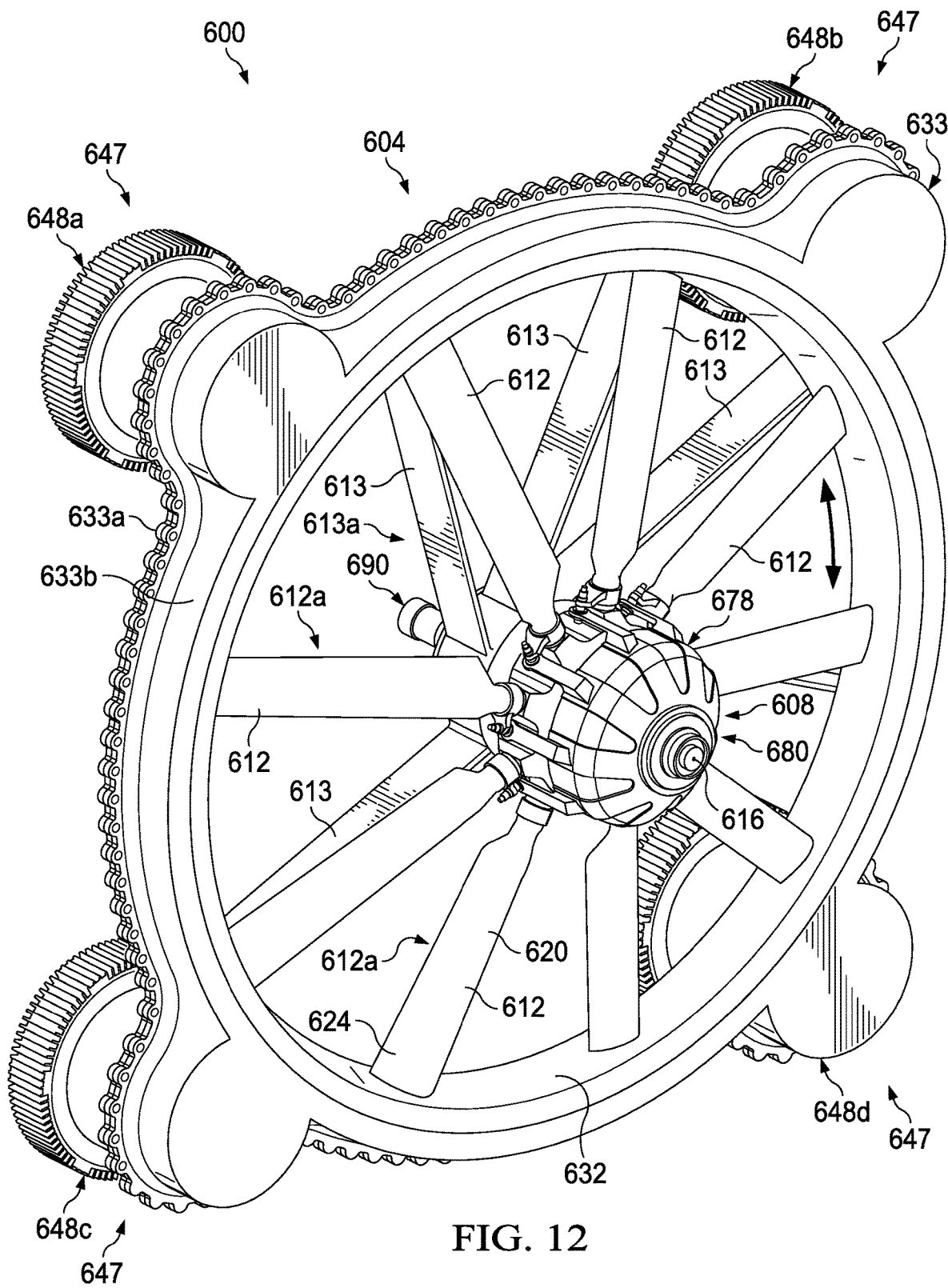
FIG. 12 is a perspective view of a rotor system, according to an example embodiment.
Figure 13:
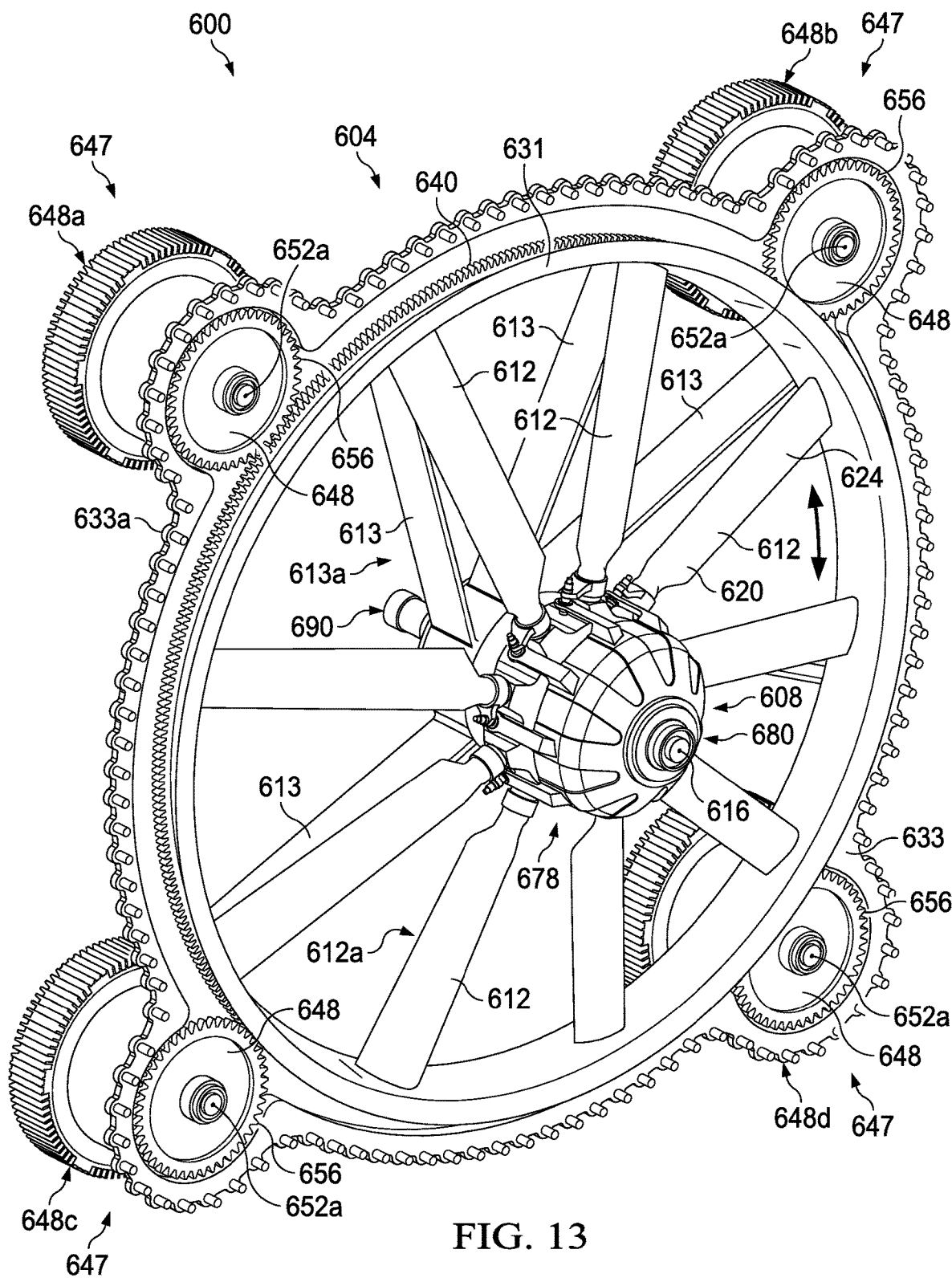
FIG. 13 is a perspective view of the rotor system in FIG. 12 with a second housing 633b removed to show the internal components, according to one example embodiment.

In an exemplary embodiment, the driving member 647 is disposed adjacent to the externally driven rim 631. The driving member 647 and the externally driven rim 631 are eccentric. The hub axis 616 is parallel to the driving member axis 652*a*. In an embodiment, the driving member 647 comprises a plurality of driving members. In an exemplary embodiment, as shown in FIGS. 12-13, the driving member 647 comprises first, second, third, and fourth driving members 648*a-d* operably coupled to the externally driven rim 631. Having a plurality of driving members 647 advantageously avoids having a single point of failure as in conventional rotor systems having a mast disposed at the central hub axis. In an exemplary embodiment, the first, second, third, and fourth driving members 648*a-d* are each comprised of an outer drive gear 648 as described herein. Each of the outer drive gears 648 are configured to rotate about driving member axis 652*a*. Driving member axis 652*a* is substantially parallel to the hub axis 616. The outer drive gears 648 can be arranged in a radial pattern about the externally driven rim 631 and are disposed outward of an engagement surface 640. Each outer drive gear 648 includes a plurality of teeth 656, which are configured to be coupled to and/or engaged with engagement surface 640 of externally driven rim 631, such that, if the engagement surface 640 of externally driven rim 631 and plurality of teeth 656 of outer drive gear 648 are coupled and/or engaged, and if outer drive gear 648 are rotated, externally driven rim 631 rotates. In an exemplary embodiment, each outer drive gear 648 is comprised of a driving pinion powered by an electric power source (e.g., an electric motor). For example, if any of the outer drive gears 648 are rotated, the externally driven rim 631 is rotated, and the plurality of rotor blade assemblies 612*a* and hub 608 are rotated about hub axis 616. Rotor system 600 is configured such that the rotatable housing 609 of hub 608 can be rotated only by the externally driven rim 631 and/or the driving member 647 via the plurality of rotor blade assemblies 612*a* (e.g., and not by one or more conventional drive systems directly coupled to hub 608). In other words, rotor system 600 is configured such that the rotatable housing 609 of hub 608 can be rotated by the plurality of rotor blade assemblies 612*a*, which are rotated by externally driven rim 631, which is rotated by at least one driving member 647. In an embodiment, the externally driven rim 631 includes an interior surface 632 (e.g., the surface forming the inside circumference).

Figure 14:
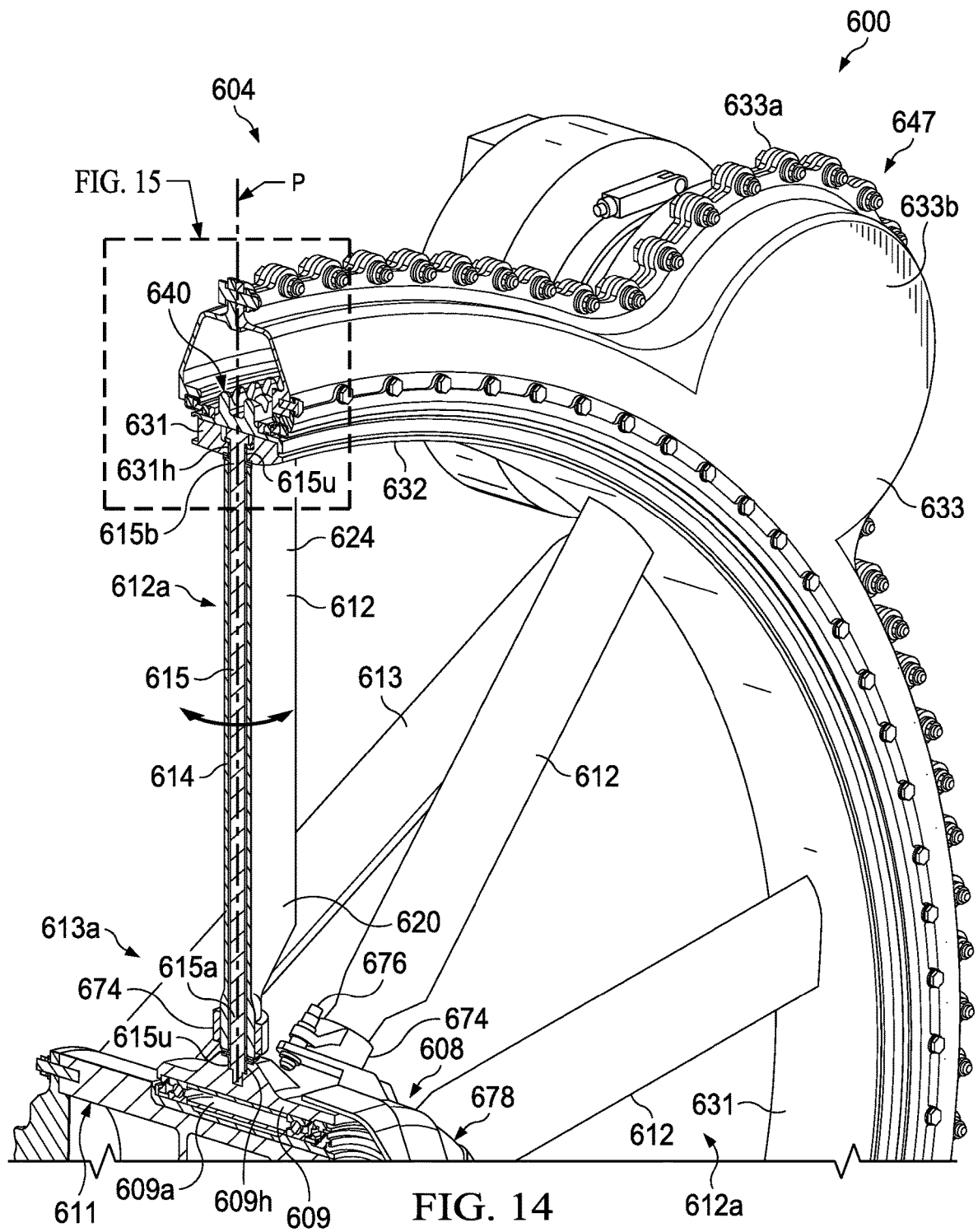
FIGS. 14 and 15 are schematic cross-sectional views of the rotor system of FIG. 12, according to one example embodiment.
Figure 15:
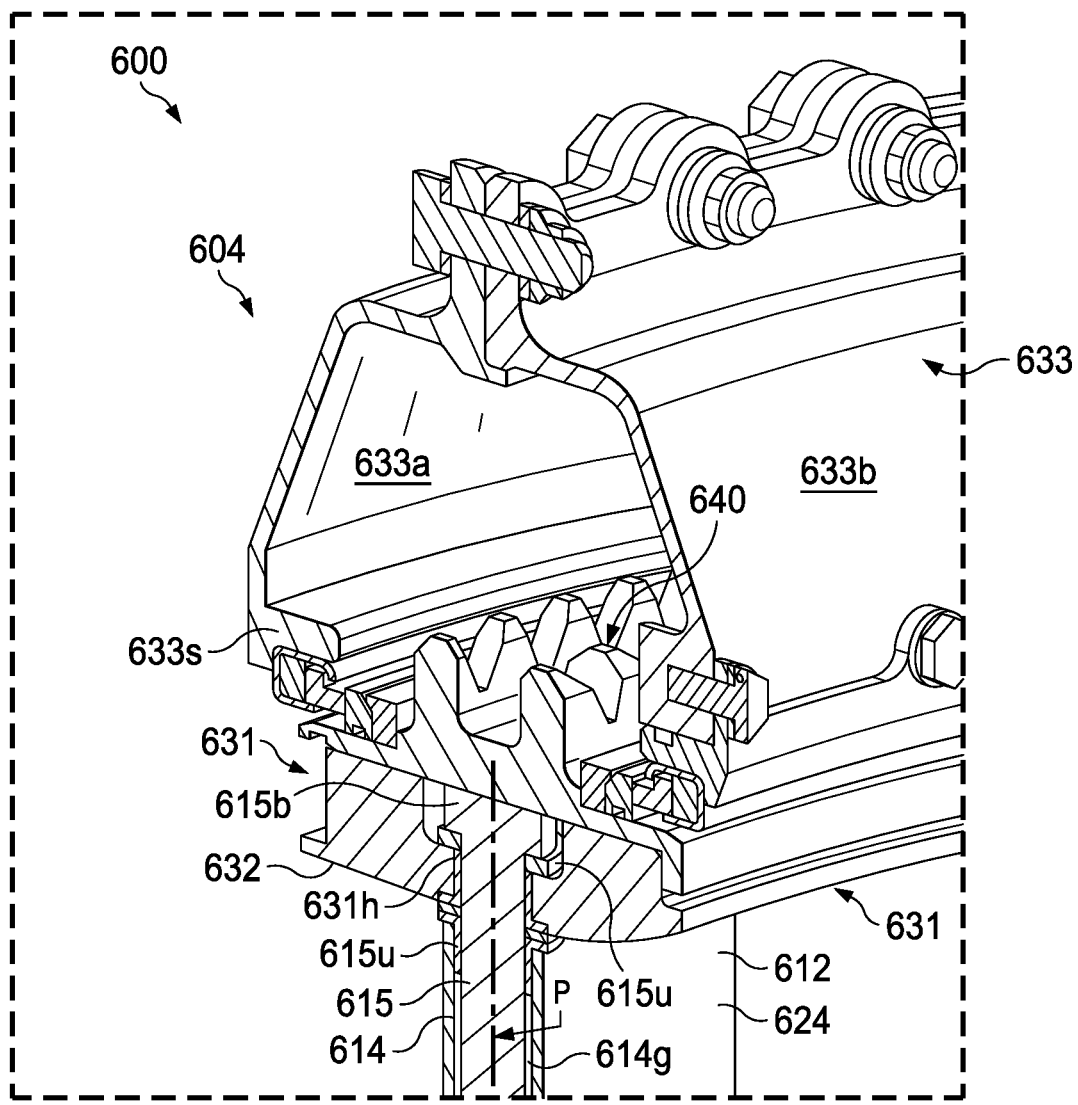
Figure 16:
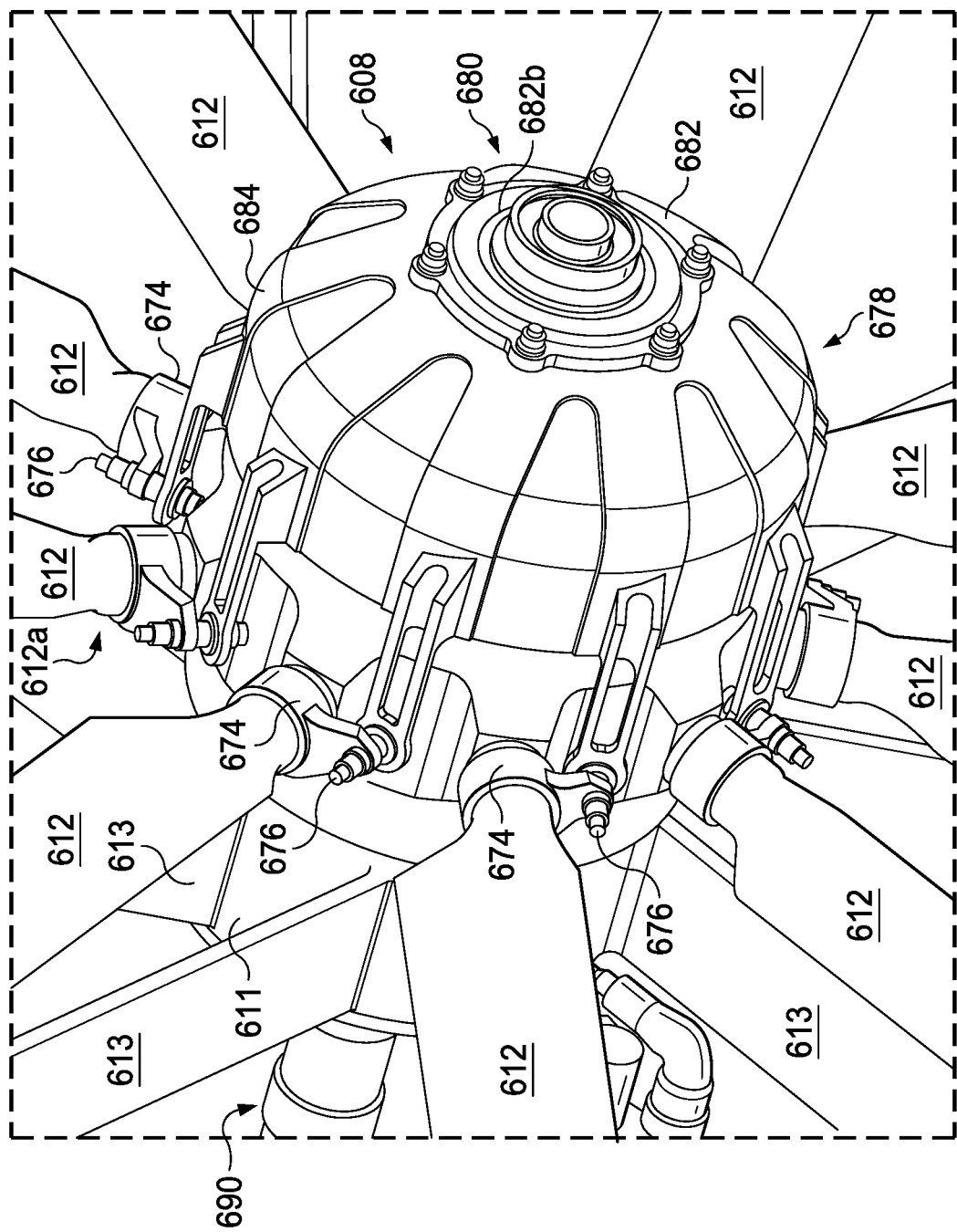
FIG. 16 is a perspective view of a hub and a pitch control mechanism including partial views of a plurality of rotor blade assemblies and a stator of the rotor system in FIG. 12, according to one example embodiment.
Figure 17:
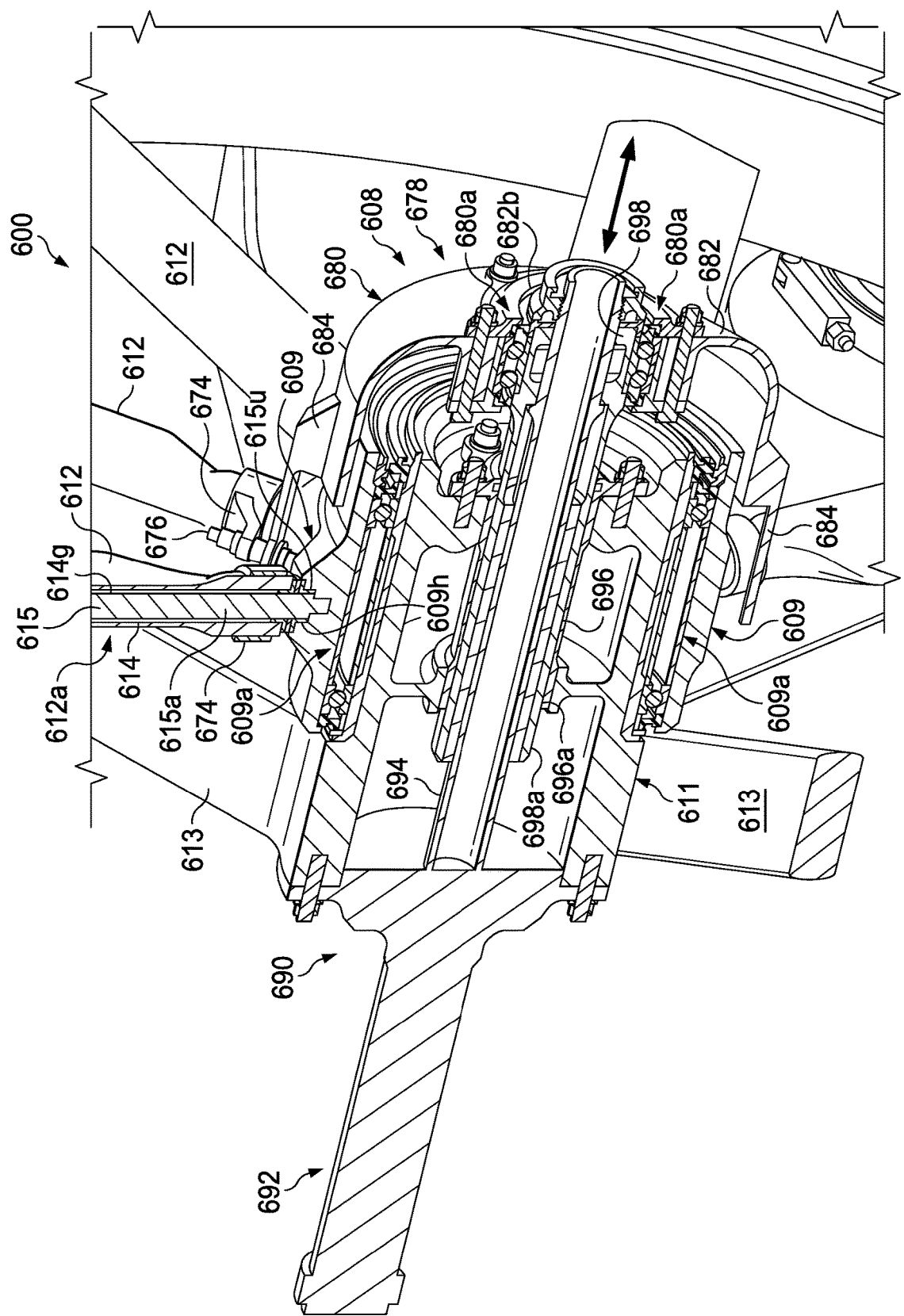
FIG. 17 is a schematic cross-sectional view of the rotor system shown in FIG. 16, according to one example embodiment.

In an embodiment, as shown in FIGS. 12-15, the rotor assembly 604 includes a housing assembly 633 that provides an enclosure for and supports the rotatable driving member 647 and externally driven rim 631. The housing assembly 633 includes a first housing 633*a* and second housing 633*b*, each having a shoulder 633*s*, as shown in FIG. 15. The first housing 633*a* is downstream of the second housing 633*b*.

The first housing 633a includes four openings for receiving the four outer drive gears 648 of the first, second, third, and fourth driving members 648a-d therein, as shown in FIG. 13. The second housing 633b is substantially circular in shape to cover the externally driven rim 631 with four rounded portions to cover the four outer drive gears 648 of the first, second, third, and fourth driving members 648a-d, as shown in FIG. 12. The first and second housings 633a, 633b are bolted together at an exterior end, which defines an outside circumference of the housing assembly 633. The interior end of the first and second housings 633a, 633b is opposite from the exterior end and includes the shoulder 633s rotatably coupled to the externally driven rim 631. A bearing and/or other friction reducing members can be used between the rotating components, namely, the driving member 647 and externally driven rim 631, and the shoulder 633s of the stationary housing assembly 633. The configuration of the housing assembly 633 permits rotation of the driving member 647 and externally driven rim 631 to rotate about their respective axis (e.g., the driving member axis 652a and hub axis 616, respectively) while the housing assembly 633 remains stationary (e.g., the housing assembly 633 does not rotate about an axis). In some embodiments, the shoulder 633s is secured to the driving member 647 and/or the externally driven rim 631 using a fastener member such as a bolt.

Figure 11:
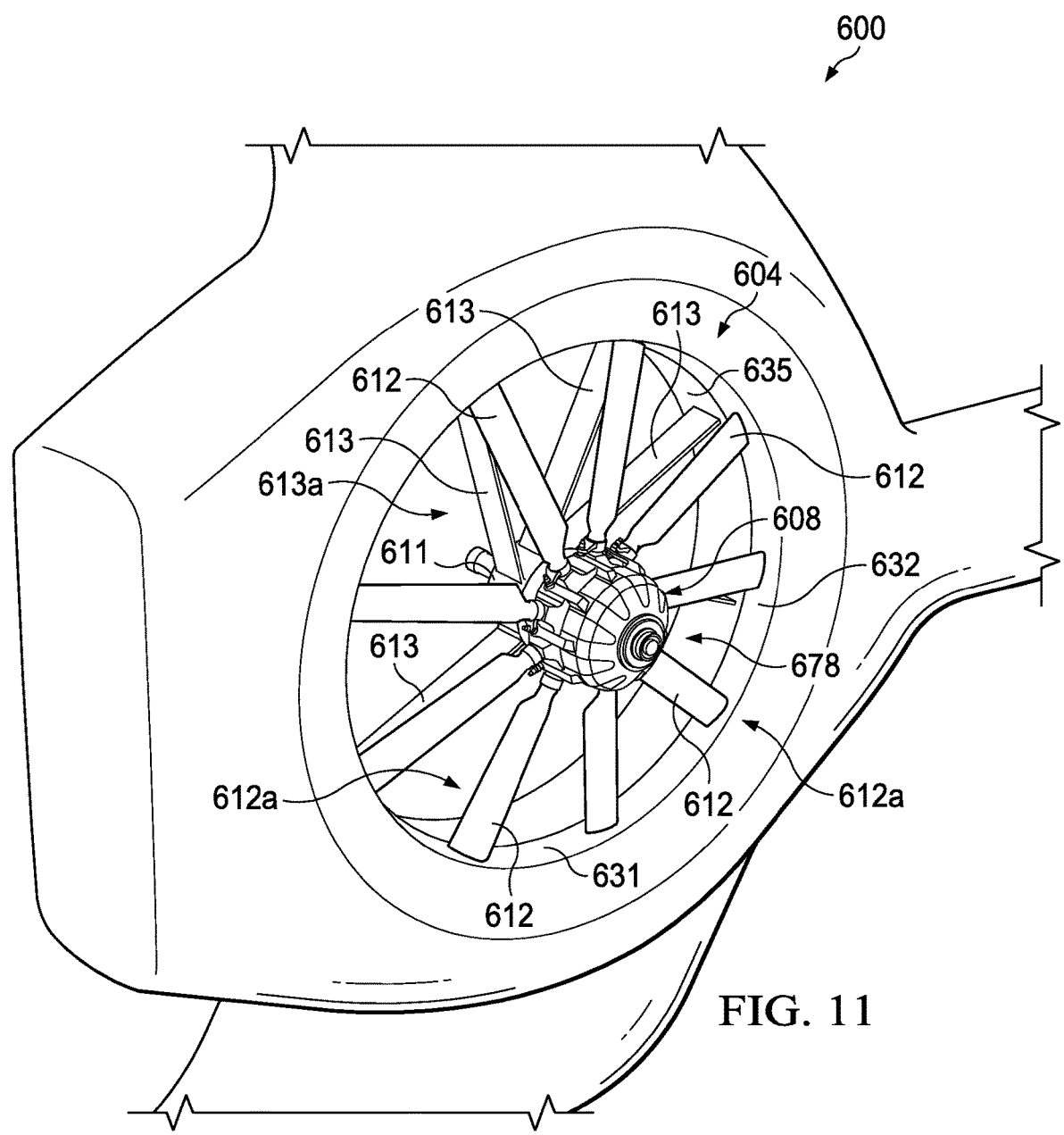
FIG. 11 is a perspective view of a rotor system in a tail portion of an aircraft, according to one example embodiment.

The hub 608 is configured to include a rotatable housing 609 and a non-rotatable housing 611 (e.g., the non-rotatable housing 611 is stationary). The rotatable housing 609 rotates about the hub axis 616 and is upstream of the non-rotatable housing 611. The rotatable housing 609 is rotatably coupled to the non-rotatable housing 611 by a first bearing assembly 609a depicted as a duplex ball bearing separated by a spacer, which provide for low friction relative rotation between the rotatable housing 609 and non-rotatable housing 611. The bearing assembly 609a can be comprised of any number of bearing combinations including a duplex tapered roller bearing or a spherical ball bearing/cylindrical roller bearing combination as previously described. The non-rotatable housing 611 of hub 608 does not rotate about hub axis 616. In an embodiment, a stator 613a is configured to extend from the non-rotatable housing 611 of hub 608 to the non-rotatable hub 635, as shown in FIG. 11. The stator 613a is fixedly mounted to the non-rotatable portion 611 of hub 608 and a non-rotatable hub 635, such that the stator 613a remains stationary during operation of the rotor assembly 604. The stator 613a includes any suitable number of fixed vanes 613, e.g., equal to or unequal to the number of rotor blades 612.

The plurality of rotor blade assemblies 612a is rotatably coupled to the rotatable housing 609 of hub 608 and the externally driven rim 631 such that rotation of the externally driven rim 631 rotates the plurality of rotor blade assemblies 612a about the hub axis 616. The rotor system 600 is configured such that the rotatable housing 609 and the plurality of rotor blade assemblies 612a can be rotated only by the externally driven rim 631 and/or by the driving member 647 about the hub axis 616.

The plurality of rotor blade assemblies 612a is comprised of more than one rotor blade assembly 612a. The plurality of rotor blade assemblies 612a are substantially symmetric; therefore, for sake of efficiency, the plurality of rotor blade assemblies 612a will only be disclosed with regard to one rotor blade assembly 612a. However, one of ordinary skill in the art would fully appreciate an understanding of the plurality of rotor blade assemblies based upon the disclosure herein.

Figure 18:
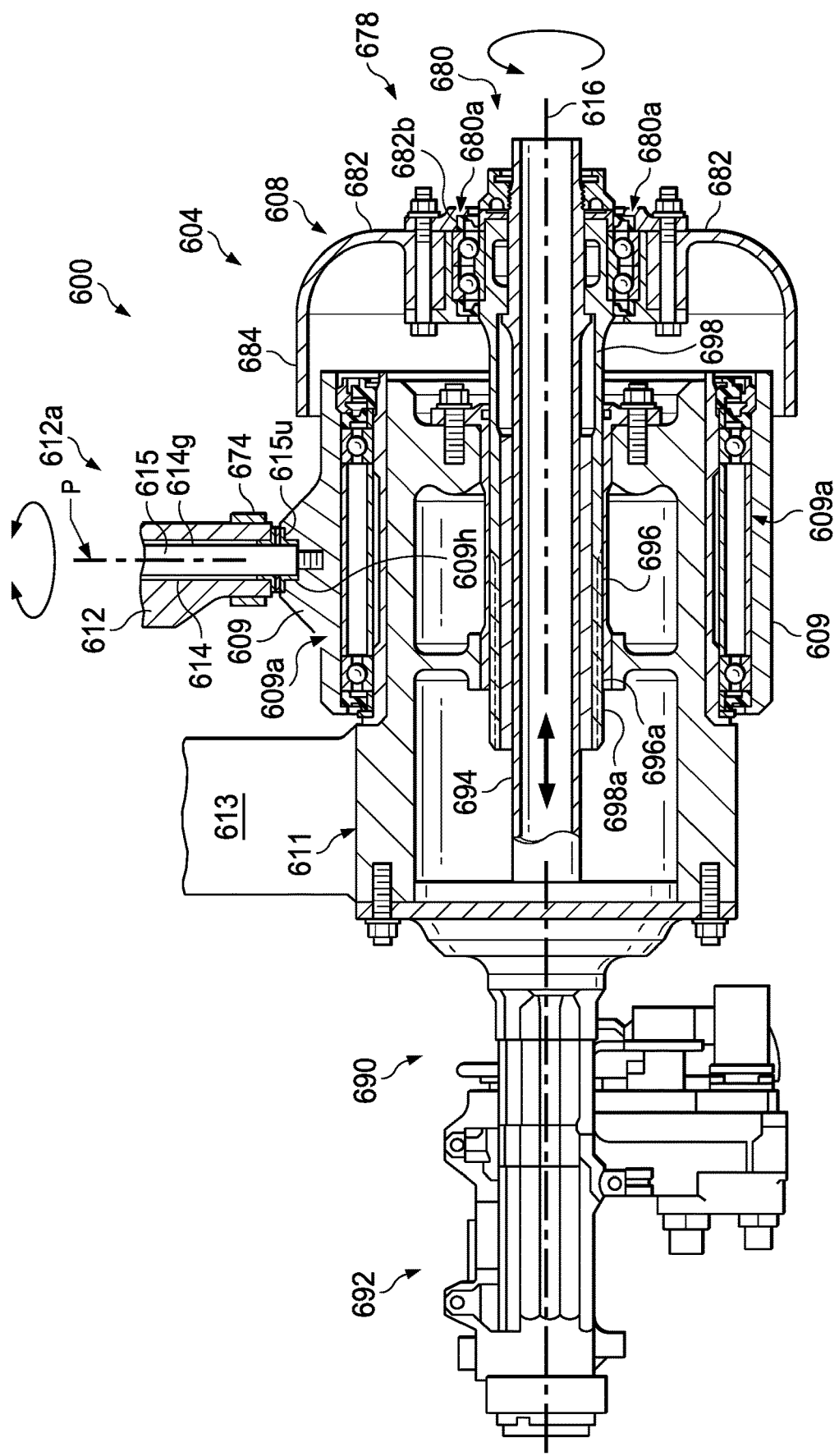
FIG. 18 is a schematic cross-sectional side view of the rotor system in FIG. 16, according to one example embodiment.

In an exemplary embodiment, each rotor blade assembly 612a comprises a rod 615 associated with a rotor blade 612. Each rotor blade assembly 612a includes an inboard portion 620, which is configured to be coupled to the rotatable housing 609 of hub 608, as best shown in FIG. 18, and an outboard portion 624, which is configured to be coupled to the externally driven rim 631. Each rotor blade assembly 612a is rotatable about the hub axis 616, as best shown in FIGS. 12 and 13. The rod 615 is disposed between the rotatable housing 609 and the externally driven rim 631. In an exemplary embodiment, the rod 615 is disposed such that the center of each rod 615 is disposed on the pitch change axis P of the respective rotor blade 612. In an exemplary embodiment, the rod 615 is stationary (e.g., it does not rotate about the pitch change axis P) but rotates with the externally driven rim 631 about the hub axis 616, which causes both the rotatable housing 609 and a spider assembly 680 of the pitch control mechanism 678 to rotate about the hub axis 616 (e.g., the rod 615 in each rotor blade assembly 612a turns the rotatable housing 609 and the spider assembly 680 about the hub axis 616). In an embodiment, the rotor blade 612 receives the rod 615 in a channel 614 therein such that the rod 615 passes through an interior of the rotor blade 612. In some embodiments, the rod 615 comprises a plurality of rods coupled to the rotor blade 612 (e.g., an inboard rod and an outboard rod coupled to the rotor blade 612). In an embodiment, the rotor blade 612 and rod 615 can be comprised of at least one of the following: a composite member, a metal member, a composite rotor blade 612 having a metallic rod 615, and a composite rotor blade 612 having a composite rod 615 associated therewith.

Each rotor blade assembly 612a is configured such that the rotor blade 612 is rotatable about a respective pitch change axis P as shown in FIGS. 14-15 and 18. The rod 615 is configured to permit rotation of the rotor blade 612 about the respective pitch change axis P. In an embodiment, as shown in FIGS. 14-15 and 17-18, rotor blade 612 freely rotates about the stationary rod 615. In an exemplary embodiment, the channel 614 leaves a gap 614g between at least a portion of the rod 615 and rotor blade 612. In an embodiment, the gap 614g is a space that is a concentric channel having no contact between the rod 615 and the blade 612 (e.g., gap 614g is concentric with the hub axis 616 and rod 615).

In an exemplary embodiment, the rod 615 extends through the channel 614 in the rotor blade 612 (e.g., through the inboard portion 620 and outboard portion 624) and beyond rotor blade 612 to include an inboard rod end 615a and an outboard rod end 615b. The inboard rod end 615a, as best shown in FIGS. 14 and 18, is received in a hole 609h disposed in the rotatable housing 609 of hub 608. The outboard rod end 615b, as best shown in FIGS. 14-15, is received in a hole 631h disposed in the externally driven rim 631. Flange bushings 615u can be applied to the holes 609h, 631h and/or to the inboard and outboard portions 620, 624 of the rotor blade 612 to line and support the holes and the rotor blade 612, respectively. In an embodiment, the flange bushings 615u are bonded to the interior portions of the holes 609h, 631h and the inboard and outboard portions 620, 624 of the channel 614 in the rotor blade 612. The flange bushings 615u are configured to accept the rod 615 for securing therein (e.g., the rod is stationary in the flange bushings 615u and does not rotate about the pitch change axis P). Flange bushings 615u may comprise a metal, steel, or the like. In some embodiments, the rotor blade 612 and/or the externally driven rim 631 are made with composite material such as carbon fiber, as opposed to a metal, flange bushings 615*u* may not be thermally fit inside holes 609*h*, 631*h*. Instead, a room temperature-cured epoxy may be used. The epoxy may include a low viscosity resin to secure flange bushings 615*u* to interiors of holes 609*h*, 631*h*. In other embodiments, it will be understood that "bonding" flange bushings 615*u*, as well as other references to "bonding" in this application, may include bounding, mounting, or otherwise securing with one or more of the following methods: thermal fitting, pressure bonding, applying adhesive in between, welding, ultrasonic welding, or any other method of attachment now known or hereinafter derived in the art. The flange bushings 615*u* advantageously reduce damage to the rod 615, the rotor blade 612, the rotatable housing 609, and/or the externally driven rim 631 from the rotor blade 612 rotating about the pitch change axis P (e.g., the flange bushings 615*u* protects the interior surface 632 of the externally driven rim 631 and/or the rotatable housing 609).

In some embodiments, the rod 615 is rotatably about the pitch change axis P and the blade 612 is connected thereto (e.g., the interior of the blade 612 is connected to the rod 615 for rotation therewith), which causes the rotor blade 612 to rotate with the rod 615 about the pitch change about axis P. The rod 615 is coupled to rotor blade 612, for example, but not limitation, the rod is coupled to an interior and/or exterior surface of the rotor blade 612. Accordingly, the flange bushings 615*u* can be configured to accept the rod 615 for rotation therein (e.g., rotation about the pitch change axis P).

In an embodiment, the rotor blade assembly 612*a* includes a pitch horn 674 coupled to the rotor blade 612 and the pitch control mechanism 678, namely, each pitch horn 674 is coupled to an arm 684 of the spider assembly 680. The pitch horn 674 functions not only to change the pitch of the rotor blade 612 associated therewith about the respective pitch change axis P, but also to rotate the spider assembly 680 of the pitch control mechanism. In an embodiment, pitch horn 674 is coupled at one end to the inboard portion 620 of rotor blade 612 by adhesive and/or secured with conventional fasteners. In the illustrative embodiment, the pitch horn 674 is coupled to the leading edge of the rotor blade 612; however, in other embodiments, the pitch horn can be coupled to the trailing edge of the rotor blade 612. At the other end, the pitch horn 674 is pivotably coupled to the arm 684 of a spider assembly 680 with a connection member 676. In an embodiment, the connection member 676 comprises a rod with a spherical bearing located therein. However, it should be appreciated that the connection member 676 may be any configuration capable of providing a structural connection between an arm 684 of the spider assembly 680 and a pitch horn 674 of the rotor blade assembly 612.

The rotor assembly 604 includes a pitch control mechanism 678 operably associated with the hub 608 and the plurality of rotor blade assemblies 612*a*. Actuation of the pitch control mechanism 678 rotates each rotor blade assembly 612 about the respective pitch change axis P to collectively control the pitch of the rotor blades 612, thereby generating a variable thrust output by the rotor system 600.

In an embodiment, the pitch control mechanism 678 includes an actuator assembly 690 disposed on the non-rotatable housing 611 of hub 608 and a spider assembly 680 associated with the rotatable housing 609 of hub 608.

The actuator assembly 690 is operably associated with the spider assembly 680 to translate the spider assembly 680 along at least a portion of the hub axis 616. The translation of the spider assembly 680 along at least a portion of the hub axis 616 raises and lowers the spider assembly 680 relative to non-rotatable housing 611 such that the raising and lowering of the spider assembly causes the pitch horns 674 associated therewith to rotate about the pitch change axis P and adjust the pitch of the rotor blades 612 in the plurality of rotor blade assemblies 612*a*. The spider assembly 680 is rotated by the driving member 647 about the hub axis 616 (e.g., via the rotating external driven rim 631 and the plurality of rotor blade assemblies 612*a*; for example, the pitch horns 674 rotate the spider assembly 680 about the hub axis 616) while the actuator assembly 690 remains stationary (e.g., the actuator assembly does not rotate about the hub axis 616) and translates the spider assembly 680 along at least a portion of the hub axis 616.

In an embodiment, the spider assembly 680 includes main body 682 and a plurality of arms 684 extending radially and downwardly (e.g., toward the non-rotatable housing 611) from the main body 682, each of which are pivotably coupled with a respective pitch horn 674 such that translation of the spider assembly 680 along the hub axis 616 rotates each pitch horn 674 about the respective pitch change axis P of the rotor blade 612. The main body 682 includes a bore 682*b* operably associated with the actuator assembly 690 for translation thereof along at a least a portion of the hub axis 616. Although not illustrated in detail, the main body 682 can include one or more gripping members positioned in the bore 682*b*, such as one or more bushings, bushing segments, wedges, slips, shoulders, dies, or other structures known in the art to selectively engage with at least a portion of the actuator assembly. The plurality of arms 684 are connected to the main body 682 and can be constructed, in some embodiments, as a unitary member. The number of arms 684 is equal to the number of the plurality of rotor blade assemblies 612*a* (e.g., one arm 684 associated with the respective rotor blade 612 via the pitch horn 674). In an embodiment, each arm 684 is rotatably coupled to the pitch horn 674 of the rotor blade assembly 612*a* with a connection member 676 as described above.

The actuator assembly 690 includes an actuator mechanism 692 configured to translate an actuator rod 694 along at least a portion of the hub axis 616. In an embodiment, the actuator mechanism 692 is positioned on a downstream end of the non-rotating (e.g., stationary) housing 611 of the hub 608. The actuator mechanism 692 is operable to linearly translate the actuator rod 694 along the hub axis 616. In an illustrative embodiment, the actuator rod 694 translates linearly but does not rotate about hub axis 616. In an embodiment the actuator mechanism 692 is a hydraulic actuator mechanism capable of producing a push/pull force to translate the actuator rod 694 along at least a portion of the hub axis 616. Non-limiting examples of the actuator mechanism 692 include at least one of the following: a linear actuator, a bell crank mechanism, and/or a geared system. The actuator mechanism 692 may receive input from a pilot in the aircraft 10, 30, a user remote from the aircraft 10, 30; and/or from a flight control computer.

In an embodiment, the actuator assembly 690 includes a tube 698 operably connected to the actuator rod 694 and to the spider assembly 680 by a second bearing assembly 680*a*. The tube 698 is non-rotatable (e.g., does not rotate about hub axis 616). The tube 698 is capable of translating along at least a portion of the hub axis 616. In some embodiments, the tube 698 is a push/pull tube. In an illustrative embodiment, the tube 698 includes an external spline 698*a* along at least a portion of tube 698. The second bearing 680*a* is depicted as a spherical bearings, which provide for a low friction rotation between the non-rotatable tube 698 and the rotating spider assembly 680.

In an exemplary embodiment, the main body 682 of the spider assembly 680 includes a bore 682b operably associated with the tube 698 for translation thereof along at a least a portion of the hub axis 616. The second bearing 680a is disposed between the main body 682 of the spider assembly 680 and the tube 698 which allows rotation of the main body 682 about the hub axis 616 while the main body 682 concurrently linearly translates along at least a portion of the hub axis 616.

In an embodiment, the actuator assembly 690 includes a sleeve 696 connected to the non-rotatable housing 611. In an embodiment, the sleeve 696 is disposed centrally within the non-rotatable housing such that the center axis of the sleeve 696 is the hub axis 616. In an embodiment, the sleeve 696 is bolted to inner support members in the non-rotatable housing 611 such that the sleeve 696 does not rotate about hub axis 616 (e.g., the sleeve 696 is stationary, non-rotatable). In an illustrative embodiment, the sleeve 696 includes an internal spline 696a along at least a portion of the sleeve 696. In an embodiment, the tube 698 is disposed in at least a portion of the sleeve 696, wherein relative translation of the external spline 698a on the tube 698 and the internal spline 696a on the sleeve 696 causes the actuator rod 694 to linearly move along at least a portion of the hub axis 616.

The main body 682 includes a bore 682b operably associated with the actuator rod 694 for translation thereof along at a least a portion of the hub axis 616. A second bearing 680a is disposed between the main body 682 and the actuator rod 694 allows rotation of the main body 682 about the hub axis 616 while the main body 682 concurrently linearly translates along at least a portion of the hub axis 616

The rotor systems and methods that are detailed above provide numerous advantages for rotor assemblies and the rotation thereof. For example, with regard to use of the rotor systems and methods with aircrafts, the rotor systems and methods of this disclosure enable the application of torque to rotate rotor assemblies at positions separate from the hub, such as through one or more gears that rotate one or more rotor blades, and the one or more rotor blades rotate the rotor hub. In other words, the present systems and methods reduce and/or eliminate the need for drive shafts and large gear boxes coupled to a rotor hub. The ability to apply torque to rotate a plurality of rotor blades separate from the hub enables the hub to be sized without regard to accommodation of a drive system, to one or more components related to the drive system, and/or to components related to the coupling of the drive system to the hub. Therefore, the present rotor systems enable use of smaller hubs in rotor assemblies, which increases the usable flow area within the rotor assembly, increases rotor assembly efficiency, and decreases weight. Furthermore, the ability to use one or more outer gears to rotate the rotor assembly enables redundancy in the powering of a rotor assembly and eliminates a single point of failure, which decreases the likelihood of rotor system failure and increases safety.

The terms "a" and "an" are defined as one or more unless this disclosure explicitly requires otherwise.

The term "substantially" is defined as largely, but not necessarily wholly, what is specified (and includes what is specified; e.g., substantially 90 degrees includes 90 degrees), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent. The term "about" is also defined as around (e.g., around an axis).

The term "couple" and its derivatives refer to any direct or indirect communication between two or more elements, whether or not those elements are in physical contact with one another.

Terms such as "first" and "second" are used only to differentiate features and not to limit the different features to a particular order or to a particular quantity.

Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Any numerical range defined by two R numbers as defined in the above is also specifically disclosed and includes the two R numbers.

Use of the term "optionally" with respect to any element of a claim means that the element is required, or alternatively, the element is not required, both alternatives being within the scope of the claim.

Use of broader terms such as comprises, includes, and has (and any derivatives of such terms, such as comprising, including, and having) should be understood to provide support for narrower terms, such as consisting of, consisting essentially of, and comprised substantially of. Thus, in any of the claims, the term "consisting of," "consisting essentially of," or "comprised substantially of" can be substituted for any of the open-ended linking verbs recited above in order to change the scope of a given claim from what it would otherwise be using the open-ended linking verb.

The same or similar features of one or more embodiments are sometimes referred to with the same reference numerals within a figure or among figures. However, one or more features having the same reference numeral should not be construed to indicate that any feature is limited to the characteristics of another feature having the same reference numeral, or that any feature cannot already have, or cannot be modified to have, features that are different from another feature having the same reference numeral.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. The feature or features of one embodiment may be applied to other embodiments to achieve still other embodiments, even though not described, unless expressly prohibited by this disclosure or the nature of the embodiments. The scope of protection is not limited by the description set out above but is defined by the claims that follow, the scope including all equivalents of the subject matter of the claims. Each and every claim is incorporated as further disclosure into the specification and the claims are embodiment(s) of the present invention.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. An aircraft rotor system comprising:
a hub having a hub axis about which the hub is configured to rotate; and
a plurality of rotor blades configured to extend from the hub and rotate about the hub axis, at least one of the rotor blades rotatable about a respective pitch change axis;
wherein the hub is configured to be rotated about the hub axis only by the plurality of rotor blades.

2. The system according to claim 1, further comprising a pitch control mechanism operably associated with the hub and the at least one of the rotor blades rotatable about a pitch change axis; the pitch control mechanism configured to rotate the at least one of the rotor blades rotatable about the respective pitch change axis to control the pitch thereof.

3. The system according to claim 2, wherein the hub comprises a rotatable housing and a non-rotatable housing.

4. The system according to claim 3, wherein the at least one of the rotor blades rotatable about a respective pitch change axis comprises a rotor blade assembly rotatably coupled to the rotatable housing.

5. The system according to claim 4, wherein the rotor blade assembly includes a rotor blade and a pitch horn associated therewith.

6. The system according to claim 5, wherein the pitch control mechanism comprises an actuator assembly disposed on the non-rotatable housing of the hub and a spider assembly translatable along at least a portion of the hub axis by the actuator assembly.

7. The system according to claim 6, wherein the actuator assembly comprises at least one of the following: a linear actuator, a bell crank mechanism, and a geared system.

8. The system according to claim 6, wherein the actuator assembly receives input from a pilot on an aircraft including the aircraft rotor system, a user remote from an aircraft including the aircraft rotor system, and/or a flight control computer.

9. The system according to claim 6, wherein the spider assembly is rotated about the hub axis by the pitch horn.

10. An aircraft rotor system comprising:
a hub having a hub axis about which the hub is configured to rotate;
an externally driven rim configured to rotate about the hub axis, the externally driven rim configured to be rotated by a driving member; and
a plurality of rotor blades operably coupled to the externally driven rim and the hub, at least one of the rotor blades rotatable about a respective pitch change axis;
wherein the externally driven rim is configured to rotate the plurality of rotor blades and the hub about the hub axis.

11. The system according to claim 10, further comprising a pitch control mechanism operably associated with the hub and the at least one of the rotor blades rotatable about the pitch change axis; the pitch control mechanism configured to rotate the at least one of the rotor blades rotatable about the respective pitch change axis to control the pitch thereof.

12. The system according to claim 10, wherein the at least one of the rotor blades rotatable about the respective pitch change axis comprises a rotor blade assembly including a rod disposed between the hub and the externally driven rim, the rod being associated with a rotor blade and configured to permit rotation of the rotor blade about the respective pitch change axis.

13. The system according to claim 12, wherein the rod is configured to rotate the hub about the hub axis.

14. The system according to claim 12, wherein the rod passes through a channel disposed in the rotor blade.

15. The system of claim 10, wherein the driving member is disposed adjacent to the externally driven rim.

16. The system of claim 15, wherein the driving member is configured to provide mechanical energy from a power source.

17. The system of claim 16, wherein the power source is mechanical, hydraulic, and/or electric.

18. The system of claim 10, wherein the driving member and the externally driven rim do not require engagement therebetween.

19. The system of claim 10, wherein the driving member comprises a plurality of driving members disposed adjacent to the externally driven rim.

20. A method of operating an aircraft rotor system comprising:
providing a rotor assembly, comprising:
a hub having a hub axis about which the hub is configured to rotate;
an externally driven rim configured to rotate about the hub axis, the externally driven rim configured to be rotated by a driving member;
a plurality of rotor blades configured to extend from the hub and rotate about the hub axis, each of the rotor blades rotatably coupled to the hub and the externally driven rim such that rotation of the externally driven rim rotates the plurality of rotor blades and the hub about the hub axis, at least one of the rotor blades rotatable about a respective pitch change axis;
a pitch control mechanism operably associated with the hub and the at least one of the rotor blades rotatable about the respective pitch change axis;
providing a driving member disposed adjacent to the externally driven rim;
rotating the driving member to impart rotation to the externally driven rim, the plurality of rotor blades, and the hub about the hub axis; and
actuating the pitch control mechanism to rotate the at least one of the rotor blades rotatable about the respective pitch change axis to control the pitch thereof.

* * * * *